US009442217B2

(12) United States Patent
Pomerantz et al.

(10) Patent No.: US 9,442,217 B2
(45) Date of Patent: Sep. 13, 2016

(54) METHODS FOR CHARACTERIZATION OF PETROLEUM RESERVOIRS EMPLOYING PROPERTY GRADIENT ANALYSIS OF RESERVOIR FLUIDS

(75) Inventors: Andrew E. Pomerantz, Lexington, MA (US); Oliver C. Mullins, Ridgefield, CT (US); Albert Ballard Andrews, Wilton, CT (US); Eric Lehne, Edmonton (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 951 days.

(21) Appl. No.: 13/641,661

(22) PCT Filed: Mar. 23, 2011

(86) PCT No.: PCT/IB2011/051230
§ 371 (c)(1),
(2), (4) Date: Feb. 6, 2013

(87) PCT Pub. No.: WO2011/132095
PCT Pub. Date: Oct. 27, 2011

(65) Prior Publication Data
US 2013/0151159 A1  Jun. 13, 2013

Related U.S. Application Data

(60) Provisional application No. 61/326,547, filed on Apr. 21, 2010.

(51) Int. Cl.
*G01V 9/00* (2006.01)
*E21B 49/08* (2006.01)
*G06F 17/00* (2006.01)

(52) U.S. Cl.
CPC ............... *G01V 9/00* (2013.01); *E21B 49/082* (2013.01); *G06F 17/00* (2013.01); *E21B 2049/085* (2013.01)

(58) Field of Classification Search
CPC ........ G01V 9/00; G01V 9/005; G01V 9/007; G01V 9/02; E21B 49/08; E21B 2049/085; E21B 2049/087; G06F 17/00
USPC ....................................... 702/11, 6
See application file for complete search history.

(56) References Cited

U.S. PATENT DOCUMENTS 7,158,887 B2    1/2007  Betancourt et al.
2008/0040086 A1  2/2008  Betancourt et al.
(Continued)

FOREIGN PATENT DOCUMENTS

WO    2009138911 A3    11/2009

OTHER PUBLICATIONS

U.S. Appl. No. 61/288,415, filed Dec. 21, 2009.
(Continued)

Primary Examiner — Toan Le
Assistant Examiner — Lynda Dinh
(74) Attorney, Agent, or Firm — Kenneth L. Kincaid

(57) ABSTRACT

A methodology for reservoir understanding employs analysis of fluid property gradients to investigate and distinguish between non-compartmentalization of the reservoir, compartmentalization of the reservoir, and lack of thermodynamic equilibrium in the reservoir.

35 Claims, 8 Drawing Sheets

(56) References Cited

U.S. PATENT DOCUMENTS

| | | | |
|---|---|---|---|
| 2009/0029879 A1* | 1/2009 | Soni | E21B 43/16 507/201 |
| 2009/0138911 A1 | 5/2009 | Flemming et al. | |
| 2009/0192768 A1 | 7/2009 | Zou et al. | |
| 2009/0235731 A1 | 9/2009 | Zuo et al. | |
| 2009/0248310 A1 | 10/2009 | Zuo et al. | |
| 2009/0312997 A1 | 12/2009 | Freed et al. | |

OTHER PUBLICATIONS

International Search Report and the Written Opinion for International Application No. PCT/IB2011/051230 dated Dec. 4, 2012.

* cited by examiner

METHODS FOR CHARACTERIZATION OF PETROLEUM RESERVOIRS EMPLOYING PROPERTY GRADIENT ANALYSIS OF RESERVOIR FLUIDS

CROSS-REFERENCE TO RELATED APPLICATIONS

The present application claims priority from U.S. Provisional Patent Application 61/326,547, filed Apr. 21, 2010, which is incorporated herein by reference in its entirety.

BACKGROUND OF THE INVENTION

1. Field of the Invention

The present invention relates to methods for characterizing petroleum fluids extracted from a hydrocarbon-bearing geological formation. The invention has application to reservoir architecture understanding, although it is not limited thereto.

2. Description of Related Art

Petroleum consists of a complex mixture of hydrocarbons of various molecular weights, plus other organic compounds. The exact molecular composition of petroleum varies widely from formation to formation. The proportion of hydrocarbons in the mixture is highly variable and ranges from as much as 97 percent by weight in the lighter oils to as little as 50 percent in the heavier oils and bitumens. The hydrocarbons in petroleum are mostly alkanes (linear or branched), cycloalkanes, aromatic hydrocarbons, or more complicated chemicals like asphaltenes. The other organic compounds in petroleum typically contain carbon dioxide ($CO_2$), nitrogen, oxygen, and sulfur, and trace amounts of metals such as iron, nickel, copper, and vanadium.

Petroleum is usually characterized by saturates-aromatics-resins-asphaltenes (SARA) fractionation where asphaltenes are removed by precipitation with a paraffinic solvent and the deasphalted oil separated into saturates, aromatics, and resins by chromatographic separation.

The saturates include alkanes and cycloalkanes. The alkanes, also known as paraffins, are saturated hydrocarbons with straight or branched chains which contain only carbon and hydrogen and have the general formula $C_nH_{2n+2}$. They generally have from 5 to 40 carbon atoms per molecule, although trace amounts of shorter or longer molecules may be present in the mixture. The alkanes include methane ($CH_4$), ethane ($C_2H_6$), propane ($C_3H_8$), i-butane ($iC_4H_{10}$), n-butane ($nC_4H_{10}$), i-pentane ($iC_5H_{12}$), n-pentane ($nC_5H_{12}$), hexane ($C_6H_{14}$), heptane ($C_7H_{16}$), octane ($C_8H_{18}$), nonane ($C_9H_{20}$), decane ($C_{10}H_{22}$), hendecane ($C_{11}H_{24}$)— also referred to as endecane or undecane, dodecane ($C_{12}H_{26}$), tridecane ($C_{13}H_{28}$), tetradecane ($C_{14}H_{30}$), pentadecane ($C_{15}H_{32}$) and hexadecane ($C_{16}H_{34}$). The cycloalkanes, also known as napthenes, are saturated hydrocarbons which have one or more carbon rings to which hydrogen atoms are attached according to the formula $C_nH_{2n}$. Cycloalkanes have similar properties to alkanes but have higher boiling points. The cycloalkanes include cyclopropane ($C_3H_6$), cyclobutane ($C_4H_8$), cyclopentane ($C_5H_{10}$), cyclohexane ($C_6H_{12}$), cycloheptane ($C_7H_{14}$), etc.

The aromatic hydrocarbons are unsaturated hydrocarbons which have one or more planar six carbon rings called benzene rings, to which hydrogen atoms are attached with the formula $C_nH_n$. They tend to burn with a sooty flame, and many have a sweet aroma. The aromatic hydrocarbons include benzene ($C_6H_6$) and derivatives of benzene, and polyaromatic hydrocarbons.

Resins are the most polar and aromatic species present in the deasphalted oil and, it has been suggested, contribute to the enhanced solubility of asphaltenes in crude oil by solvating the polar and aromatic portions of the asphaltenic molecules and aggregates.

Asphaltenes are insoluble in n-alkanes (such as n-pentane or n-heptane) and soluble in toluene. The C:H ratio is approximately 1:1.2, depending on the asphaltene source. Unlike most hydrocarbon constituents, asphaltenes typically contain a few percent of other atoms (called heteroatoms), such as sulfur, nitrogen, oxygen, vanadium, and nickel. Heavy oils and tar sands contain much higher proportions of asphaltenes than do medium-API oils or light oils. Condensates are virtually devoid of asphaltenes. As far as asphaltene structure is concerned, experts agree that some of the carbon and hydrogen atoms are bound in ring-like, aromatic groups, which also contain the heteroatoms. Alkane chains and cyclic alkanes contain the rest of the carbon and hydrogen atoms and are linked to the ring groups. Within this framework, asphaltenes exhibit a range of molecular weight and composition. Asphaltenes have been shown to have a distribution of molecular weight in the range of 300 to 1400 g/mol with an average of about 750 g/mol. This is compatible with a molecule containing seven or eight fused aromatic rings, and the range accommodates molecules with four to ten rings.

It is also known that asphaltene molecules aggregate to form nanoaggregates and clusters. The aggregation behavior depends on the solvent type. Laboratory studies have been conducted with asphaltene molecules dissolved in a solvent such as toluene. At extremely low concentrations (below $10^{-4}$ mass fraction), asphaltene molecules are dispersed as a true solution. At higher concentrations (on the order of $10^{-4}$ mass fraction), the asphaltene molecules stick together to form nanoaggregates. These nanoaggregates are dispersed in the fluid as a nanocolloid, meaning the nanometer-sized asphaltene particles are stably suspended in the continuous liquid phase solvent. At even higher concentrations (on the order of $5 \times 10^{-3}$ mass fraction), the asphaltene nanoaggregates form clusters that remain stable as a colloid suspended in the liquid phase solvent. At higher concentrations (on the order of $5 \times 10^{-2}$ mass fraction), the asphaltene clusters flocculate to form clumps which precipitate out of the toluene solvent. In crude oil, asphaltenes exhibit a similar aggregation behavior. However, at the higher concentrations (on the order of $5 \times 10^{-2}$ mass fraction) that cause asphaltene clusters to flocculate in toluene, stability can continue such that the clusters form a viscoelastic network.

Computer-based modeling and simulation techniques have been developed for estimating the properties and/or behavior of petroleum fluid in a reservoir of interest. Typically, such techniques employ an equation of state (EOS) model that represents the phase behavior of the petroleum fluid in the reservoir. Once the EOS model is defined, it can be used to compute a wide array of properties of the petroleum fluid of the reservoir, such as: gas-oil ratio (GOR) or condensate-gas ratio (CGR), density of each phase, volumetric factors and compressibility, heat capacity and saturation pressure (bubble or dew point). Thus, the EOS model can be solved to obtain saturation pressure at a given temperature. Moreover, GOR, CGR, phase densities, and volumetric factors are byproducts of the EOS model. Transport properties, such as heat capacity or viscosity, can be derived from properties obtained from the EOS model, such as fluid composition. Furthermore, the EOS model can be extended with other reservoir evaluation techniques for compositional simulation of flow and production behavior of the petroleum fluid of the reservoir, as is well known in the art. For example, compositional simulations can be helpful in studying (1) depletion of a volatile oil or gas condensate reservoir where phase compositions and properties vary significantly with pressure below bubble or dew point pressures, (2) injection of non-equilibrium gas (dry or enriched) into a black oil reservoir to mobilize oil by vaporization into a more mobile gas phase or by condensation through an outright (single-contact) or dynamic (multiple-contact) miscibility, and (3) injection of $CO_2$ into an oil reservoir to mobilize oil by miscible displacement and by oil viscosity reduction and oil swelling.

In the past few decades, fluid homogeneity in a hydrocarbon reservoir has been assumed. However, there is now a growing awareness that fluids are often heterogeneous or compartmentalized in the reservoir. A compartmentalized reservoir consists of two or more compartments that effectively are not in hydraulic communication. Two types of reservoir compartmentalization have been identified, namely vertical and lateral compartmentalization. Vertical compartmentalization usually occurs as a result of faulting or stratigraphic changes in the reservoir, while lateral compartmentalization results from barriers to horizontal flow.

Natural convection, biodegradation, adsorption, and external fluxes can also lead to non-equilibrium hydrocarbon distribution in a reservoir.

Reservoir compartmentalization can significantly hinder production and can make the difference between an economically-viable field and an economically-nonviable field. Techniques to aid an operator to accurately describe reservoir compartments and their distribution can increase understanding of such reservoirs and ultimately raise production and lower technical risk.

Conventionally, reservoir compartmentalization has been determined utilizing pressure-depth plots and pressure gradient analysis with traditional straight-line regression schemes. This process may, however, be misleading as fluid compositional changes and compartmentalization give distortions in the pressure gradients, which result in erroneous interpretations of fluid contacts or pressure seals. Additionally, pressure communication does not prove flow connectivity.

US Patent Application Publication 2009/0312997 provides a methodology for correlating composition data of live oil measured using a downhole fluid analysis tool with predicted composition data to determine whether asphaltenes are in an equilibrium distribution within the reservoir. The methodology treats asphaltenes within the framework of polymer solution theory (Flory-Huggins model as modified by Zuo, herein the Flory-Huggins-Zuo model). The methodology generates a family of curves that predicts asphaltene content as a function of depth. The curves can be viewed as a function of two parameters, the volume and solubility of the asphaltene particle. The curves can be fit to measured relative asphaltene content as derived from the downhole fluid analysis tool. There can be uncertainty in the fitting process as asphaltene volume can vary widely. In these instances, it can be difficult to assess the accuracy of the Flory-Huggins-Zuo model and the resulting determinations based thereon at any given time, and thus know whether or not there is a need to acquire and analyze more downhole samples in order to refine or tune the Flory-Huggins-Zuo model and the resulting determinations based thereon. Moreover, in the case that the distribution of asphaltenes diverges from the equilibrium distribution predicted by the model, it is difficult to distinguish whether the reservoir fluids are compartmentalized or in a state of thermodynamic non-equilibrium.

BRIEF SUMMARY OF THE INVENTION

It is therefore an object of the invention to provide methods that accurately characterize compositional components and fluid properties at varying locations in a reservoir in order to allow for accurate reservoir architecture analysis (e.g., detection of connectivity (or compartmentalization) and equilibrium (or non-equilibrium) hydrocarbon distribution in the reservoir of interest).

It is another object of the invention to provide methods that investigate and distinguish between non-compartmentalization of the reservoir, compartmentalization of the reservoir, and lack of thermodynamic equilibrium in the reservoir.

In accord with one embodiment of the invention, the method of the invention investigates non-compartmentalization of the reservoir by matching a predicted concentration gradient of a high molecular weight fraction (e.g., asphaltenes) to a concentration gradient of the high molecular weight fraction derived from downhole fluid analysis.

In accord with another embodiment of the invention, the method of the invention investigates non-compartmentalization of the reservoir by matching a predicted concentration gradient of GOR to the GOR gradient derived from downhole fluid analysis.

In accord with another embodiment of the invention, the method of the invention investigates compartmentalization of the reservoir by analyzing fluid property gradients (preferably a pressure gradient, viscosity gradient and density gradient) derived from downhole fluid analysis to identify one or more localized areas of the reservoir where there are discontinuities in such fluid property gradients. In each localized area, the magnitude of one or more fluid property gradients derived from downhole fluid analysis is compared to the magnitude of other predicted fluid gradients. If the differences between the magnitudes satisfy certain constraints, the method of the invention can infer a likelihood that the reservoir is compartmentalized. For example, a large increase between the magnitude of the viscosity gradient derived from downhole fluid analysis and the magnitude of the predicted asphaltene concentration gradient (and/or predicted GOR gradient) infers a likelihood that reservoir fluids are compartmentalized by a tar mat within the localized area. Conversely, small differences between the magnitude of the viscosity gradient derived from downhole fluid analysis and the magnitude of the predicted asphaltene concentration gradient (and/or predicted GOR gradient) infers a likelihood that the reservoir is non-compartmentalized within the localized area. In another example, a large increase between the magnitude of the GOR gradient derived from downhole fluid analysis and the magnitude of the predicted asphaltene concentration gradient infers a likelihood that reservoir fluids are compartmentalized by a tar mat within the localized area. Conversely, small differences between the magnitude of the GOR gradient derived from downhole fluid analysis and the magnitude of the predicted asphaltene concentration gradient infers a likelihood that the reservoir is non-compartmentalized in the localized area. Additional operations can be carried out to identify the likely cause of the compartmentalization of the reservoir.

In accord with yet another embodiment of the invention, the method of the invention investigates lack of thermodynamic equilibrium in the reservoir by carrying out both downhole and laboratory measurements of the composition (e.g., GOR and asphaltene concentration, total acid number (TAN), and sulfoxide content) and possibly other physical properties (e.g., temperature) of fluids from multiple locations in a reservoir. Additional operations can be carried out to identify the likely cause of the non-equilibrium state of the reservoir fluids.

The methods of the invention employ a downhole fluid analysis tool to obtain and perform downhole fluid analysis of live oil samples at multiple measurement stations within a wellbore traversing a reservoir of interest. Such downhole fluid analysis measures compositional components and possibly other fluid properties (e.g., temperature, pressure, fluid density, fluid viscosity) of each live oil sample. The downhole measurements are used with at least one predictive model to predict gradients of the compositional components, and other fluid properties for the reservoir analysis.

In the preferred embodiment, the predictive models include an EOS model as well as a Flory-Huggins-Zuo type solubility model that characterizes relative concentrations of a set of high molecular weight components as a function of depth as related to relative solubility, density, and molar volume of the high molecular weight components of the set at varying depth. The solubility model treats the reservoir fluid as a mixture of two parts, the two parts being a solute part and a solvent part, the solute part comprising the set of high molecular weight components. The high molecular weight components of the solute part are preferably selected from the group including resin or asphaltene molecules, asphaltene nanoaggregates, and asphaltene clusters. Preferred embodiments of such models are set forth in detail below.

Additional objects and advantages of the invention will become apparent to those skilled in the art upon reference to the detailed description taken in conjunction with the provided figures.

DETAILED DESCRIPTION OF THE INVENTION

Figure 1A:
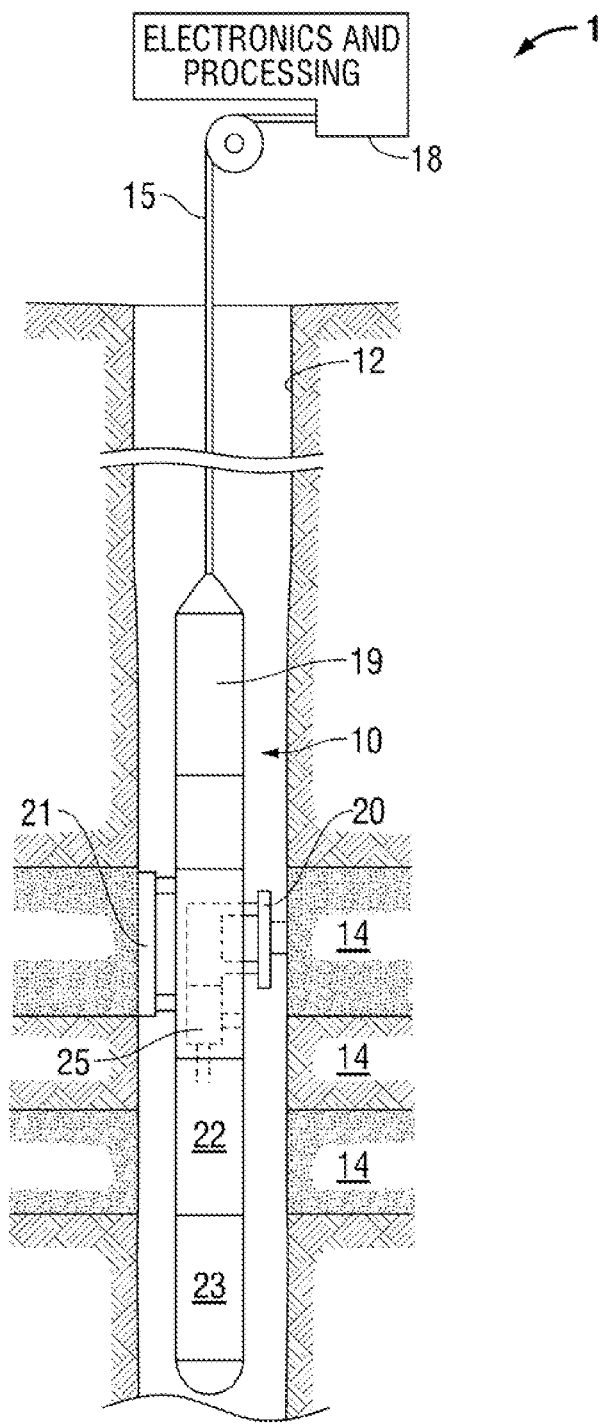
FIG. 1A is a schematic diagram of an exemplary petroleum reservoir analysis system in which the present invention is embodied.

FIG. 1A illustrates an exemplary petroleum reservoir analysis system 1 in which the present invention is embodied. The system 1 includes a borehole tool 10 suspended in the borehole 12 from the lower end of a typical multiconductor cable 15 that is spooled in a usual fashion on a suitable winch on the formation surface. The cable 15 is electrically coupled to an electrical control system 18 on the formation surface. The borehole tool 10 includes an elongated body 19 which carries a selectively extendable fluid admitting assembly 20 and a selectively extendable tool anchoring member 21 which are respectively arranged on opposite sides of the tool body. The fluid admitting assembly 20 is equipped for selectively sealing off or isolating selected portions of the wall of the borehole 12 such that fluid communication with the adjacent earth formation 14 is established. The fluid admitting assembly 20 and borehole tool 10 include a flowline leading to a fluid analysis module 25. The formation fluid obtained by the fluid admitting assembly 20 flows through the flowline and through the fluid analysis module 25. The fluid may thereafter be expelled through a port or it may be sent to one or more fluid collecting chambers 22 and 23 which may receive and retain the fluids obtained from the formation. With the fluid admitting assembly 20 sealingly engaging the formation 14, a short rapid pressure drop can be used to break the mudcake seal. Normally, the first fluid drawn into the downhole tool 10 will be highly contaminated with mud filtrate. As the tool continues to draw fluid from the formation 14, the area near the fluid admitting assembly 20 cleans up and reservoir fluid becomes the dominant constituent. The time required for cleanup depends upon many parameters, including formation permeability, fluid viscosity, the pressure differences between the borehole and the formation, and overbalanced pressure difference and its duration during drilling. Increasing the pump rate can shorten the cleanup time, but the rate must be controlled carefully to preserve formation pressure conditions.

The fluid analysis module 25 includes means for measuring the temperature and pressure of the fluid in the flowline. The fluid analysis module 25 derives properties that characterize the formation fluid sample at the flowline pressure and temperature. In the preferred embodiment, the fluid analysis module 25 measures absorption spectra and translates such measurements into concentrations of several alkane components and groups in the fluid sample. In an illustrative embodiment, the fluid analysis module 25 provides measurements of the concentrations (e.g., weight percentages) of carbon dioxide ($CO_2$), methane ($CH_4$), ethane ($C_2H_6$), the C3-C5 alkane group, the lump of hexane and heavier alkane components (C6+), and asphaltene content. The C3-C5 alkane group includes propane, butane, and pentane. The C6+ alkane group includes hexane ($C_6H_{14}$), heptane ($C_7H_{16}$), octane ($C_8H_{18}$), nonane ($C_9H_{20}$), decane ($C_{10}H_{22}$), hendecane ($C_{11}H_{24}$)— also referred to as endecane or undecane, dodecane ($C_{12}H_{26}$), tridecane ($C_{13}H_{28}$), tetradecane ($C_{14}H_{30}$), pentadecane ($C_{15}H_{32}$), hexadecane ($C_{16}H_{34}$), etc. The fluid analysis module 25 also provides a means that measures live fluid density ($\rho$) at the flowline temperature and pressure, live fluid viscosity ($\mu$) at flowline temperature and pressure (in cp), formation pressure, and formation temperature.

Control of the fluid admitting assembly 20 and fluid analysis module 25, and the flow path to the collecting chambers 22, 23 is maintained by the control system 18. As will be appreciated by those skilled in the art, the fluid analysis module 25 and the surface-located electrical control system 18 include data processing functionality (e.g., one or more microprocessors, associated memory, and other hardware and/or software) to implement the invention as described herein. The electrical control system 18 can also be realized by a distributed data processing system wherein data measured by the downhole tool 10 is communicated (preferably in real-time) over a communication link (typically a satellite link) to a remote location for data analysis as described herein. The data analysis can be carried out on a workstation or other suitable data processing system (such as a computer cluster or computing grid).

Formation fluids sampled by the downhole tool 10 may be contaminated with mud filtrate. That is, the formation fluids may be contaminated with the filtrate of a drilling fluid that seeps into the formation 14 during the drilling process. Thus, when fluids are withdrawn from the formation 14 by the fluid admitting assembly 20, they may include mud filtrate. In some examples, formation fluids are withdrawn from the formation 14 and pumped into the borehole or into a large waste chamber in the downhole tool 10 until the fluid being withdrawn becomes sufficiently clean. A clean sample is one where the concentration of mud filtrate in the sample fluid is acceptably low so that the fluid substantially represents native (i.e., naturally occurring) formation fluids. In the illustrated example, the downhole tool 10 is provided with fluid collecting chambers 22 and 23 to store collected fluid samples.

The system of FIG. 1A is adapted to make in-situ determinations regarding hydrocarbon-bearing geological formations by downhole sampling of reservoir fluid at one or more measurement stations within the borehole 12, conducting downhole fluid analysis of one or more reservoir fluid samples for each measurement station (including compositional analysis such as estimating concentrations of a plurality of compositional components of a given sample as well as other fluid properties), and relating the downhole fluid analysis to an equation of state (EOS) model of the thermodynamic behavior of the fluid in order to characterize the reservoir fluid at different locations within the reservoir. With the reservoir fluid characterized with respect to its thermodynamic behavior, fluid production parameters, transport properties, and other commercially useful indicators of the reservoir can be computed.

For example, the EOS model can provide the phase envelope that can be used to interactively vary the rate at which samples are collected in order to avoid entering the two-phase region. In another example, the EOS can provide useful properties in assessing production methodologies for the particular reserve. Such properties can include density, viscosity, and volume of gas formed from a liquid after expansion to a specified temperature and pressure. The characterization of the fluid sample with respect to its thermodynamic model can also be used as a benchmark to determine the validity of the obtained sample, whether to retain the sample, and/or whether to obtain another sample at the location of interest. More particularly, based on the thermodynamic model and information regarding formation pressures, sampling pressures, and formation temperatures, if it is determined that the fluid sample was obtained near or below the bubble line of the sample, a decision may be made to jettison the sample and/or to obtain a sample at a slower rate (i.e., a smaller pressure drop) so that gas will not evolve out of the sample. Alternatively, because knowledge of the exact dew point of a retrograde gas condensate in a formation is desirable, a decision may be made, when conditions allow, to vary the pressure drawdown in an attempt to observe the liquid condensation and thus establish the actual saturation pressure.

Figure 1B:
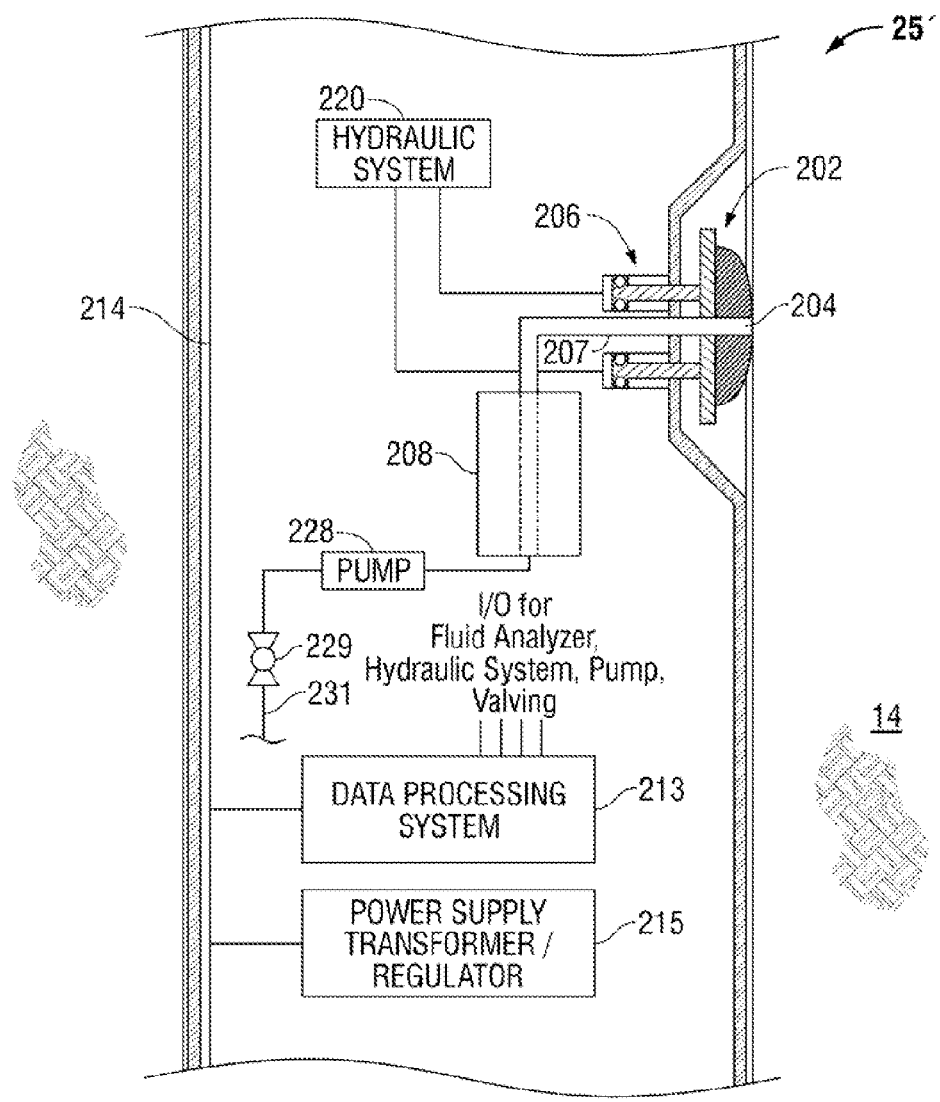
FIG. 1B is a schematic diagram of an exemplary fluid analysis module suitable for use in the borehole tool of FIG. 1A.
Figure 2A:
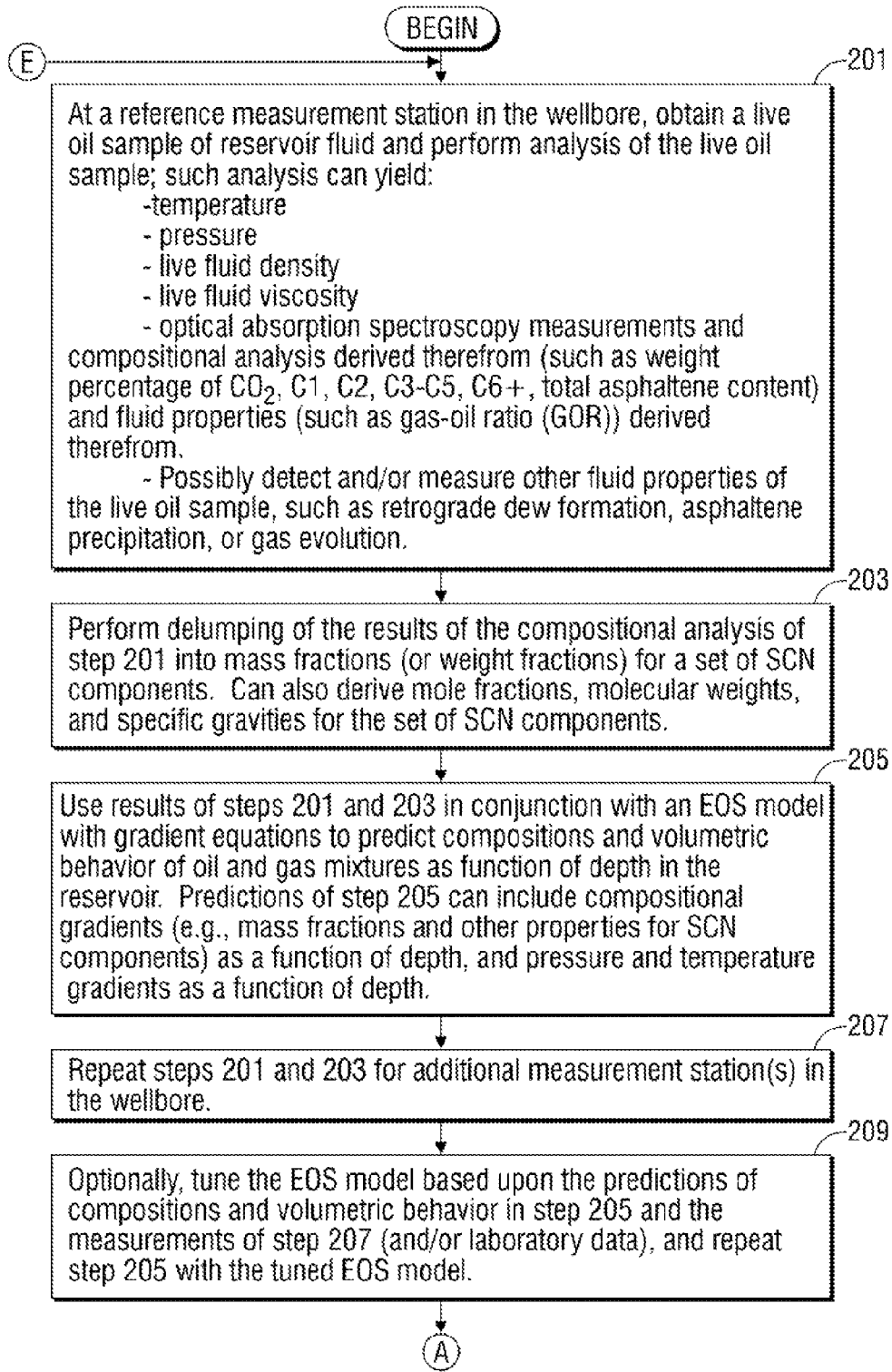
FIGS. 2A-2D, collectively, are a flow chart of data analysis operations that include downhole fluid measurements at a number of different measurement stations within a wellbore traversing a reservoir or interest in conjunction with derivation and analysis of fluid property gradients to investigate and distinguish between non-compartmentalization of the reservoir of interest, compartmentalization of the reservoir of interest, and lack of thermodynamic equilibrium in the reservoir of interest. The fluid property gradients include a predicted concentration gradient of a high molecular weight fraction generated by a Flory-Huggins-Zuo type solubility model that characterizes relative concentrations of a set of high molecular weight components as a function of depth as related to relative solubility, density, and molar volume of the high molecular weight components of the set at varying depth.
Figure 2B:
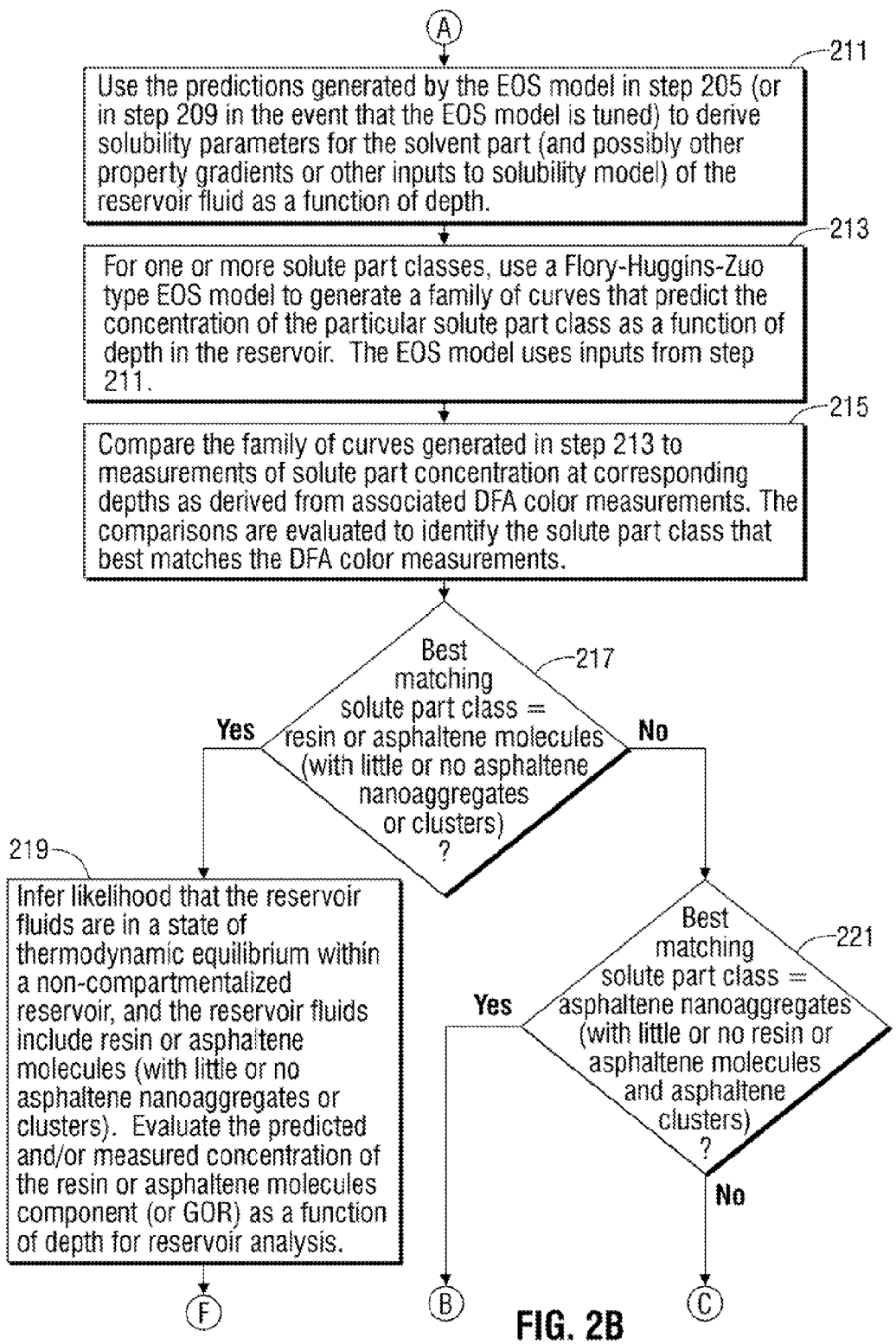
Figure 2C:
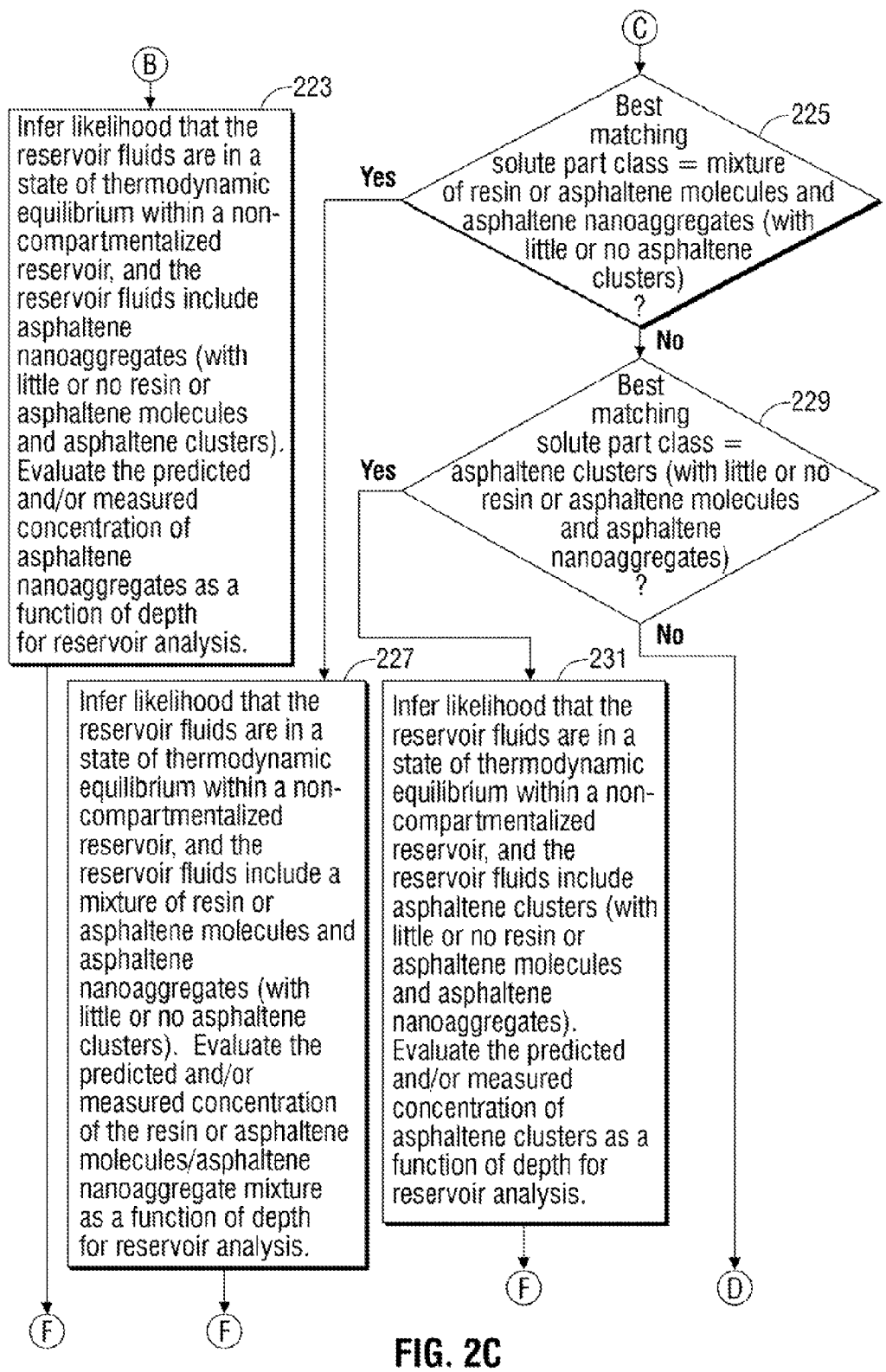
Figure 2D:
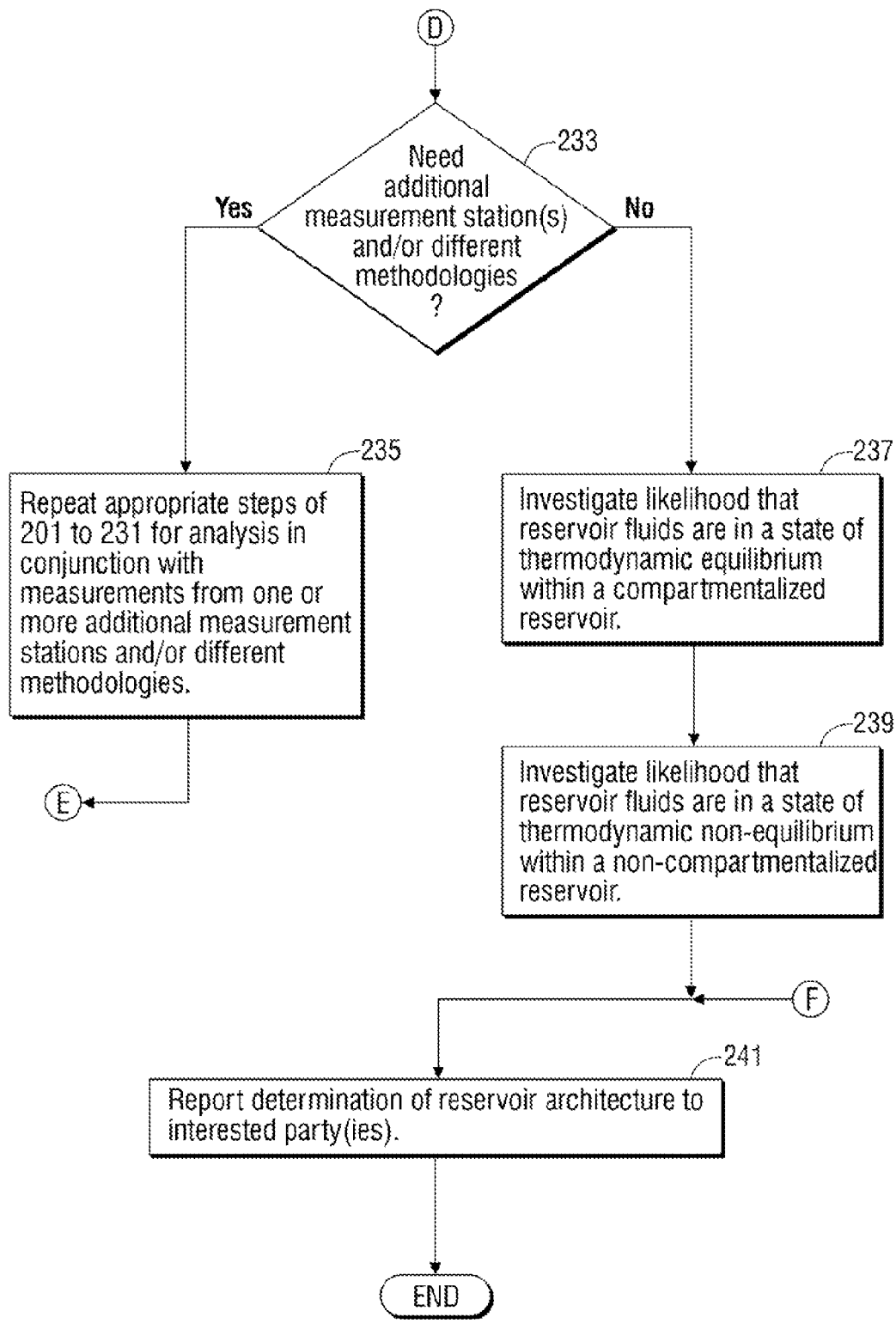

FIG. 1B illustrates an exemplary embodiment of the fluid analysis module 25 of FIG. 1A (labeled 25'), including a probe 202 having a port 204 to admit formation fluid therein. A hydraulic extending mechanism 206 may be driven by a hydraulic system 220 to extend the probe 202 to sealingly engage the formation 14 (FIG. 1A). In alternative implementations, more than one probe can be used or inflatable packers can replace the probe(s) and function to establish fluid connections with the formation and sample fluid samples.

The probe 202 can be realized by the Quicksilver Probe available from Schlumberger Technology Corporation of Sugar Land, Tex., USA. The Quicksilver Probe divides the fluid flow from the reservoir into two concentric zones, a central zone isolated from a guard zone about the perimeter of the central zone. The two zones are connected to separate flowlines with independent pumps. The pumps can be run at different rates to exploit filtrate/fluid viscosity contrast and permeability anistrotropy of the reservoir. Higher intake velocity in the guard zone directs contaminated fluid into the guard zone flowline, while clean fluid is drawn into the central zone. Fluid analyzers analyze the fluid in each flowline to determine the composition of the fluid in the respective flowlines. The pump rates can be adjusted based on such compositional analysis to achieve and maintain desired fluid contamination levels. The operation of the Quicksilver Probe efficiently separates contaminated fluid from cleaner fluid early in the fluid extraction process, which results in obtaining clean fluid in much less time compared to traditional formation testing tools.

The fluid analysis module 25' includes a flowline 207 that carries formation fluid from the port 204 through a fluid analyzer 208. The fluid analyzer 208 includes a light source that directs light to a sapphire prism disposed adjacent the flowline fluid flow. The reflection of such light is analyzed by a gas refractometer and dual fluoroscene detectors. The gas refractometer qualitatively identifies the fluid phase in the flowline. At the selected angle of incidence of the light emitted from the diode, the reflection coefficient is much larger when gas is in contact with the window than when oil or water is in contact with the window. The dual fluoroscene detectors detect free gas bubbles and retrograde liquid dropout to accurately detect single phase fluid flow in the flowline 207. Fluid type is also identified. The resulting phase information can be used to define the difference between retrograde condensates and volatile oils, which can have similar GORs and live oil densities. It can also be used to monitor phase separation in real-time and ensure single phase sampling. The fluid analyzer 208 also includes dual spectrometers—a filter-array spectrometer and a grating-type spectrometer.

The filter-array spectrometer of the analyzer 208 includes a broadband light source providing broadband light that passes along optical guides and through an optical chamber in the flowline to an array of optical density detectors that are designed to detect narrow frequency bands (commonly referred to as channels) in the visible and near-infrared spectra as described in U.S. Pat. No. 4,994,671, incorporated herein by reference in its entirety. Preferably, these channels include a subset of channels that detect water-absorption peaks (which are used to characterize water content in the fluid) as well as a dedicated channel corresponding to the absorption peak of $CO_2$ with dual channels above and below this dedicated channel that subtract out the overlapping spectrum of hydrocarbon and small amounts of water (which are used to characterize $CO_2$ content in the fluid). The filter-array spectrometer also employs optical filters that provide for identification of the color (also referred to as "optical density" or "OD") of the fluid in the flowline. Such color measurements support fluid identification, determination of asphaltene content, and pH measurement. Mud filtrates or other solid materials generate noise in the channels of the filter-array spectrometer. Scattering caused by these particles is independent of wavelength. In the preferred embodiment, the effect of such scattering can be removed by subtracting a nearby channel.

The grating-type spectrometer of the fluid analyzer 208 is designed to detect channels in the near-infrared spectra (preferably between 1600-1800 nm) where reservoir fluid has absorption characteristics that reflect molecular structure.

The fluid analyzer 208 also includes a pressure sensor for measuring pressure of the formation fluid in the flowline 207, a temperature sensor for measuring temperature of the formation fluid in the flowline 207, and a density sensor for measuring live fluid density of the fluid in the flowline 207. In the preferred embodiment, the density sensor is realized by a vibrating sensor that oscillates in two perpendicular modes within the fluid. Simple physical models describe the resonance frequency and quality factor of the sensor in relation to live fluid density. Dual mode oscillation is advantageous over other resonant techniques because it minimizes the effects of pressure and temperature on the sensor through common mode rejection. In addition to density, the density sensor can also provide a measurement of live fluid viscosity from the quality factor of oscillation frequency. Note that live fluid viscosity can also be measured by placing a vibrating object in the fluid flow and measuring the increase in line width of any fundamental resonance. This increase in line width is related closely to the viscosity of the fluid. The change in frequency of the vibrating object is closely associated with the mass density of the object. If density is measured independently, then the determination of viscosity is more accurate because the effects of a density change on the mechanical resonances are determined. Generally, the response of the vibrating object is calibrated against known standards. The fluid analyzer 208 can also measure resistivity and pH of the fluid in flowline 207. In the preferred embodiment, the fluid analyzer 208 is realized by the InSitu Fluid Analyzer available from Schlumberger Technology Corporation. In other exemplary implementations, the flowline sensors of the fluid analyzer 208 may be replaced or supplemented with other types of suitable measurement sensors (e.g., NMR sensors, capacitance sensors, etc.). Pressure sensor(s) and/or temperature sensor(s) for measuring pressure and temperature of fluid drawn into the flowline 207 can also be part of the probe 202.

A pump 228 is fluidly coupled to the flowline 207 and is controlled to draw formation fluid into the flowline 207 and possibly to supply formation fluid to the fluid collecting chambers 22 and 23 (FIG. 1A) via valve 229 and flowpath 231 (FIG. 1B).

The fluid analysis module 25' includes a data processing system 213 that receives and transmits control and data signals to the other components of the module 25' for controlling operations of the module 25'. The data processing system 213 also interfaces to the fluid analyzer 208 for receiving, storing, and processing the measurement data generated therein. In the preferred embodiment, the data processing system 213 processes the measurement data output by the fluid analyzer 208 to derive and store measurements of the hydrocarbon composition of fluid samples analyzed in-situ by the fluid analyzer 208, including flowline temperature;
flowline pressure;
live fluid density ($\rho$) at the flowline temperature and pressure;
live fluid viscosity ($\mu$) at flowline temperature and pressure;
concentrations (e.g., weight percentages) of carbon dioxide ($CO_2$), methane ($CH_4$), ethane ($C_2H_6$), the C3-C5 alkane group, the lump of hexane and heavier alkane components (C6+), and asphaltene content;
GOR; and
possibly other parameters (such as API gravity and oil formation volume factor ($B_o$))

Flowline temperature and pressure is measured by the temperature sensor and pressure sensor, respectively, of the fluid analyzer 208 (and/or probe 202). In the preferred embodiment, the outputs of the temperature sensor(s) and pressure sensor(s) are monitored continuously before, during, and after sample acquisition to derive the temperature and pressure of the fluid in flowline 207. The formation temperature is not likely to deviate substantially from the flowline temperature at a given measurement station and thus can be estimated as the flowline temperature at the given measurement station in many applications. Formation pressure can be measured by the pressure sensor of the fluid analyzer 208 in conjunction with the downhole fluid sampling and analysis at a particular measurement station after buildup of the flowline to formation pressure.

Live fluid density ($\rho$) at the flowline temperature and pressure is determined by the output of the density sensor of the fluid analyzer 208 at the time the flowline temperature and pressure are measured.

Live fluid viscosity ($\mu$) at flowline temperature and pressure is derived from the quality factor of the density sensor measurements at the time the flowline temperature and pressure are measured.

The measurements of the hydrocarbon composition of fluid samples are derived by translation of the data output by spectrometers of the fluid analyzer 208. In the preferred embodiment, such translation employs an empirical relation that relates color (i.e., optical density) measured by the spectrometer of the fluid analyzer 208 to a measurement of concentration of a high molecular weight fraction of the reservoir fluids of the form:

$$OD_{DFA} = C1 * W_a + C2,$$

where $OD_{DFA}$ is the measured color of the formation fluid at a particular wavelength (this particular wavelength can vary over different reservoirs, but usually it will be in the ultra-violet or visible or near-infrared parts of the spectrum);

$W_a$ is the corresponding mass fraction of the high molecular weight fraction; and C1 and C2 are constants derived from empirical data, C1 being in the range of 0.1-30, and C2 close to 0. The particular wavelength can be sensitive to the class and/or concentration of the high molecular weight fraction of interest. More specifically, lower wavelengths (e.g., wavelengths in the visible band around 500 nm) are typically better suited to characterize resin or asphaltene molecules, longer wavelengths (e.g., wavelengths in the near-infrared band around 1000 nm) are typically better suited to characterize asphaltene clusters, and wavelengths between 700 nm and 900 nm are typically better suited to characterize asphaltene nanoaggregates.

The GOR is determined by measuring the quantity of methane and liquid components of crude oil using near-infrared absorption peaks. The ratio of the methane peak to the oil peak on a single phase live crude oil is directly related to GOR.

The fluid analysis module 25' can also detect and/or measure other fluid properties of a given live oil sample, including retrograde dew formation, asphaltene precipitation, and/or gas evolution.

fraction at varying depth. In the preferred embodiment, the solubility model treats the reservoir fluid as a mixture of two parts: a solute part (the high molecular weight fraction) and a solvent part (the lighter components other than the high molecular weight fraction, referred to herein as the maltene). The solvent part is a mixture (solution) whose properties are measured by downhole fluid analysis and/or estimated by an EOS model. It is assumed that the reservoir fluids are connected (i.e., there is a lack of compartmentalization) and in thermodynamic equilibrium. In this approach, the relative concentration (volume fraction) of the solute part as a function of depth is given by:

$$\frac{\phi_a(h_2)}{\phi_a(h_1)} = \exp\left\{\frac{v_a g(\rho_m - \rho_a)(h_2 - h_1)}{RT} + \left(\frac{v_a}{v_m}\right)_{h_2} - \left(\frac{v_a}{v_m}\right)_{h_1} - \frac{v_a\left[(\delta_a - \delta_m)_{h_2}^2 - (\delta_a - \delta_m)_{h_1}^2\right]}{RT}\right\} \quad (1)$$

The fluid analysis module 25' also includes a tool bus 214 that communicates data signals and control signals between the data processing system 213 and the surface-located control system 18 of FIG. 1A. The tool bus 214 can also carry electrical power supply signals generated by a surface-located power source for supply to the fluid analysis module 25', and the module 25' can include a power supply transformer/regulator 215 for transforming the electric power supply signals supplied via the tool bus 214 to appropriate levels suitable for use by the electrical components of the module 25'.

Although the components of FIG. 1B are shown and described above as being communicatively coupled and arranged in a particular configuration, persons of ordinary skill in the art will appreciate that the components of the fluid analysis module 25' can be communicatively coupled and/or arranged differently than depicted in FIG. 1B without departing from the scope of the present disclosure. In addition, the example methods, apparatus, and systems described herein are not limited to a particular conveyance type but, instead, may be implemented in connection with different conveyance types including, for example, coiled tubing, wireline, wired drill pipe, and/or other conveyance means known in the industry.

In accordance with the present invention, the system of FIGS. 1A and 1B can be employed with the methodology of FIGS. 2A-2D to characterize the fluid properties of a petroleum reservoir of interest based upon downhole fluid analysis of samples of reservoir fluid. As will be appreciated by those skilled in the art, the surface-located electrical control system 18 and the fluid analysis module 25 of the downhole tool 10 each include data processing functionality (e.g., one or more microprocessors, associated memory, and other hardware and/or software) that cooperate to implement the invention as described herein. The electrical control system 18 can also be realized by a distributed data processing system wherein data measured by the downhole tool 10 is communicated in real time over a communication link (typically a satellite link) to a remote location for data analysis as described herein. The data analysis can be carried out on a workstation or other suitable data processing system (such as a computer cluster or computing grid).

The fluid analysis of FIGS. 2A-2D relies on an equation of state model to characterize relative concentrations of a high molecular weight fraction (in the preferred embodiment, an asphaltene pseudocomponent) as a function of depth in the oil column as related to relative solubility, density, and molar volume of such high molecular weight where
$\phi_a(h_1)$ is the volume fraction for the solute part at depth $h_1$,
$\phi_a(h_2)$ is the volume fraction for the solute part at depth $h_2$,
$v_a$ is the partial molar volume for the solute part,
$v_m$ is the molar volume for the maltene,
$\delta_a$ is the solubility parameter for the solute part,
$\delta_m$ is the solubility parameter for the maltene,
$\rho_a$ is the partial density for the solute part,
$\rho_m$ is the density for the maltene,
R is the universal gas constant, and
T is the absolute temperature of the reservoir fluid.

In Eq. (1), referred to herein as the Flory-Huggins-Zuo equation of state, it is assumed that properties of the solute part (e.g., the high molecular weight fraction) are independent of depth. For properties of the maltene that are a function of depth, average values between depths can be used. The first exponential term of Eq. (1) arises from gravitational contributions. The second and third exponential terms arise from the combinatorial entropy change of mixing. The fourth exponential term arises from the enthalpy (solubility) change of mixing. It can be assumed that the reservoir fluid is isothermal. In this case, the temperature T can be set to the average formation temperature as determined from downhole fluid analysis. Alternatively, a temperature gradient with depth (preferably a linear temperature distribution) can be derived from downhole fluid analysis and the temperature T at a particular depth determined from such temperature gradient.

The density $\rho_m$ of the maltene at a given depth can be derived from the partial densities of the components of the maltene at the given depth by:

$$\rho_m = \sum_j \rho_j \phi_j \quad (2)$$

where $\phi_j$ is the volume fraction of the component j of the maltene at the given depth, and
$\rho_j$ is the partial density for the component j of the maltene at the given depth.

The volume fractions $\phi_j$ for the components of the maltene at the given depth can be measured, estimated from measured mass or mole fractions, estimated from the solution of the compositional gradients produced by the EOS model, or other suitable approach. The partial density $\rho_j$ for the components of the maltene at the given depth can be known, estimated from the solution of the compositional gradients produced by the EOS model, or other suitable approach.

The molar volume $v_m$ for the maltene at a given depth can be derived by:

$$v_m = \frac{\sum_j x_j m_j}{\rho_m} \quad (3)$$

where
$x_j$ is the mole fraction of component j of the maltene,
m is the molar mass of component j of the maltene, and
$\rho_m$ is the density of the maltene.

The mole fractions $x_j$ for the components of the maltene at the given depth can be measured, estimated from measured mass or mole fractions, estimated from the solution of the compositional gradients produced by the EOS model, or other suitable approach. The molar mass $m_j$ for the components of the maltene are known. The density $\rho_m$ for the maltene at the given depth is provided by the solution of Eq. (2).

The solubility parameter $\delta_m$ for the maltene at a given depth can be derived as the average of the solubility parameters for the components of the maltene at the given depth, given by:

$$\delta_m = \left(\sum_h \phi_j \delta_j\right) / \sum_j \phi_j \quad (4)$$

where
$\phi_j$ is the volume fraction of the component j of the maltene at the given depth, and
$\delta_j$ is the solubility parameter for the component j of the maltene at the given depth.

The volume fractions $\phi_j$ at the given depth can be measured, estimated from measured mass or mole fractions, estimated from the solution of the compositional gradients produced by the EOS model, or other suitable approach. The solubility parameters $\delta_j$ at the given depth can be known, or estimated from measured mass or mole fractions, estimated from the solution of the compositional gradients produced by the EOS model, or other suitable approach.

It is also contemplated that the solubility parameter $\delta_m$ for the maltene at a given depth can be derived from an empirical correlation to the density $\rho_m$ of the maltene at a given depth. For example, the solubility parameter $\delta_m$ (in $MPa^{0.5}$) can be derived from:

$$\delta_m = D\rho_m + C \quad (5)$$

where
$D=(0.004878R_s+9.10199)$,
$C=(8.3271\rho-0.004878R_s\rho+2.904)$,
$R_s$ is the GOR at the given depth in scf/STB, and
$\rho$ is the bulk live oil density at the given depth in g/cm$^3$.

The GOR($R_s$) as a function of depth in the oil column can be measured by downhole fluid analysis or derived from the predictions of compositional components of the reservoir fluid as a function of depth as described below. The bulk live oil density ($\rho$) as a function of depth can be measured by downhole fluid analysis or derived from the predictions of compositional components of the reservoir fluid as a function of depth. In another example, the solubility parameter $\delta_m$ (in $MPa^{0.5}$) can be derived from a simple correlation to the density $\rho_m$ of the maltene at a given depth (in g/cm$^3$) given by:

$$\delta_m=17.347\rho_m+2.904. \quad (6)$$

The density $\rho_m$ for the maltene at the given depth can be provided by the solution of Eq. (2).

Furthermore, if the concentrations of the high molecular weight fraction are small, certain properties of the maltene can be approximated by the corresponding bulk fluid properties of the mixture, which can be measured by downhole fluid analysis or derived from the predictions of compositional components of the reservoir fluid as a function of depth or derived from another suitable approach. For example, the density $\rho_m$ of the maltene at a given depth can be equated to the bulk fluid density as measured by downhole fluid analysis (and/or laboratory analysis). The solubility parameter $\delta_m$ for the maltene can be equated to the bulk fluid solubility parameter as derived from a correlation to bulk fluid density, for example using the form of Eq. (6).

The solubility parameter (in $MPa^{0.5}$) of the solute part can be derived from a given temperature gradient relative to a reference measurement station ($\Delta T = T - T_0$) by:

$$\delta_a(T)=\delta(T_0)[1-1.07\times10^{-3}(\Delta T)] \quad (7)$$

where
$T_0$ is the temperature at reference measurement station (e.g., $T_0=298.15$ K), and
$\delta_a(T_0)$ is a solubility parameter (in $MPa^{0.5}$) for the solute part at $T_o$
(e.g., $\delta_a(T_0)=21.85$ $MPa^{0.5}$).

The impact of pressure on the solubility parameter for the solute part is small and negligible.

The partial density (in kg/m$^3$) of the solute part can be derived from a constant, such as 1.2 kg/m$^3$.

Other types of functions can be employed to correlate the properties of the solute part as a function of depth. For example, a linear function of the form of Eq. (8) can be used to correlate a property of the solute part (such as partial density and solubility parameter) as a function of depth by:

$$\alpha=c\Delta h+\alpha_{ref} \quad (8)$$

where
$\alpha$ is the property (such as partial density and solubility parameter) of the solute part,
c is a coefficient,
$\alpha_{ref}$ is the property of the solute part at a reference depth, and
$\Delta h$ is the difference in height relative to the reference depth.

Once the properties noted above are obtained, the remaining adjustable parameter in Eq. (1) is the molar volume of the solute part. The molar volume of the solute part varies for different classes of the high molecular weight fraction. For example, resin or asphaltene molecules have a smaller molar volume than asphaltene nanoaggregates, which have a smaller molar volume than asphaltene clusters. The model assumes that the molar volume of the solute part is constant as a function of depth. A spherical model is preferably used to estimate the molar volume of the solute part by:

$$V=\frac{1}{6}*\pi*d^3*Na \quad (9)$$

where V is the molar volume, d is the molecular diameter, and Na is Avogadro's constant.

For example, for the class where the solute part includes resin or asphaltene molecules (with little or no asphaltene nanoaggregates and asphaltene clusters), the molecular diameter d can vary over a range of 1.25±0.15 nm. For the class where the solute part includes asphaltene nanoaggregates (with little or no resin or asphaltene molecules and asphaltene clusters), the molecular diameter d can vary over a range of 1.8±0.2 nm. For the class where the solute part includes asphaltene clusters (with little or no resin or asphaltene molecules and asphaltene nanoaggregates), the molecular diameter d can vary over a range of 4.0±0.5 nm. For the class where the solute part is a mixture of resin or asphaltene molecules and asphaltene nanoaggregates (with little or no asphaltene clusters), the molecular diameter d can vary over the range corresponding to such resin or asphaltene molecules and nanoaggregates (e.g., between 1.25 nm and 1.8 nm). These diameters are exemplary in nature and can be adjusted as desired.

In this manner, Eq. (1) can be used to determine a family of curves for one or more solute part classes. For example, the solute part classes can include resin or asphaltene molecules, asphaltene nanoaggregates, asphaltene clusters, and combinations thereof. One solute part class can include resin or asphaltene molecules with little or no asphaltene nanoaggregates or clusters. Another solute part class can include resin or asphaltene molecules and asphaltene nanoaggregates with little or no clusters. A further solute part class can include asphaltene clusters with little or no resin or asphaltene molecules and asphaltene nanoaggregates. The family of curves represents an estimation of the concentration of the solute part class as a function of height. Each curve of the respective family is derived from a molecular diameter d that falls within the range of diameters for the corresponding solute part class. A solution can be solved by fitting the curves to corresponding measurements of the concentration of the respective solute part class at varying depths as derived from downhole fluid analysis to determine the best matching curve. For example, the family of curves for the solute part class including resin or asphaltene molecules (with little or no asphaltene nanoaggregates and asphaltene clusters) can be fit to measurements of resin concentrations (derived from color measurements by downhole fluid analysis as described above) at varying depth. In another example, the family of curves for the solute part class including asphaltene nanoaggregates (with little or no resin or asphaltene molecules and asphaltene clusters) can be fit to measurements of asphaltene nanoaggregate concentrations (derived from color measurements by downhole fluid analysis as described above) at varying depth. In yet another example, the family of curves for the solute part class including resin or asphaltene molecules and asphaltene nanoaggregates (with little or no asphaltene clusters) can be fit to measurements of mixed resin or asphaltene molecules and asphaltene nanoaggregate concentrations (derived from color measurements by downhole fluid analysis as described above) at varying depth. In still another example, the family of curves for the solute part class including asphaltene clusters (with little or no resin or asphaltene molecules and asphaltene nanoaggregates) can be fit to measurements of asphaltene cluster concentrations (derived from color measurements by downhole fluid analysis as described above) at varying depth. If a best fit is identified, the estimated and/or measured properties of the best matching solute class (or other suitable properties) can be used for reservoir analysis. If no fit is possible, then the reservoir fluids might not be in equilibrium or a more complex formulism may be required to describe the petroleum fluid in the reservoir.

Other suitable structural models can be used to estimate and vary the molar volume for the different solute part classes. It is also possible that Eq. (1) can be simplified by ignoring all but the first exponent term, which gives an analytical model of the form:

$$\frac{\phi_a(h_2)}{\phi_a(h_1)} = \exp\left\{\frac{v_i g(\rho_m - \rho_a)(h_2 - h_1)}{RT}\right\} \qquad (10)$$

This Eq. (10) can be solved in a manner similar to that described above for Eq. (1) in order to derive the relative concentration of solute part as a function of depth (h) in the reservoir. This form or Eq. (1) is typical for low GOR black oils.

The operations of FIGS. 2A-2D begin in step 201 by employing the downhole fluid analysis (DFA) tool of FIGS. 1A and 1B to obtain a sample of the formation fluid at the reservoir pressure and temperature (a live oil sample) at a measurement station in the wellbore (for example, a reference station). The sample is processed by the fluid analysis module 25. In the preferred embodiment, the fluid analysis module 25 performs spectrophotometry measurements that measure absorption spectra of the sample and translates such spectrophotometry measurements into concentrations of several alkane components and groups in the fluids of interest. In an illustrative embodiment, the fluid analysis module 25 provides measurements of the concentrations (e.g., weight percentages) of carbon dioxide ($CO_2$), methane ($CH_4$), ethane ($C_2H_6$), the C3-C5 alkane group including propane, butane, pentane, the lump of hexane and heavier alkane components (C6+), and asphaltene content. The downhole tool 10 also preferably provides a means to measure temperature of the fluid sample (and thus reservoir temperature at the station), pressure of the fluid sample (and thus reservoir pressure at the station), live fluid density ($\rho$) of the fluid sample, live fluid viscosity ($\mu$) of the fluid sample, gas-oil ratio (GOR) of the fluid sample, optical density, and possibly other fluid parameters (such as API gravity and oil formation volume fraction ($B_O$)) of the fluid sample.

In step 203, a delumping process is carried out to characterize the compositional components of the sample analyzed in step 201. The delumping process splits the concentration (e.g., mass fraction, which is sometimes referred to as weight fraction) of given compositional lumps (C3-C5, C6+) into concentrations (e.g., mass fractions) for single carbon number (SCN) components of the given compositional lump (e.g., split C3-C5 lump into C3, C4, C5, and split C6+ lump into C6, C7, C8 . . . ). Details of the exemplary delumping operations carried out as part of step 203 are provided in US Patent Application Publication 2009/0192768, which is incorporated herein by reference in its entirety.

In step 205, the results of the delumping process of step 203 are used in conjunction with an equation of state (EOS) model to predict compositions and fluid properties (such as volumetric behavior of oil and gas mixtures) as a function of depth in the reservoir. In the preferred embodiment, the predictions of step 205 include property gradients, pressure gradients and temperature gradients of the reservoir fluid as a function of depth. The property gradients preferably include density, viscosity, molecular weights, and specific gravities for a set of SCN components (but not for asphaltenes) as a function of depth in the reservoir. The property gradients predicted in step 205 preferably do not include compositional gradients (i.e., mass fractions and mole fractions) for the heavy molecular weight fraction (e.g., resin and asphaltenes) as a function of depth as such analysis is provided by an EOS model as described herein in more detail.

The EOS model of step 205 includes a set of equations that represent the phase behavior of the compositional components of the reservoir fluid. Such equations can take many forms. For example, they can be any one of many cubic EOS, as is well known. Such cubic EOS include van der Waals EOS (1873), Redlich-Kwong EOS (1949), Soave-Redlich-Kwong EOS (1972), Peng-Robinson EOS (1976), Stryjek-Vera-Peng-Robinson EOS (1986) and Patel-Teja EOS (1982). Volume shift parameters can be employed as part of the cubic EOS in order to improve liquid density predictions, as is well known. Mixing rules (such as van der Waals mixing rule) can also be employed as part of the cubic EOS. A SAFT-type EOS can also be used, as is well known in the art. In these equations, the deviation from the ideal gas law is largely accounted for by introducing (1) a finite (non-zero) molecular volume and (2) some molecular interaction. These parameters are then related to the critical constants of the different chemical components.

In the preferred embodiment, the EOS model of step 205 predicts compositional gradients with depth that take into account the impacts of gravitational forces, chemical forces, thermal diffusion, etc. To calculate compositional gradients with depth in a hydrocarbon reservoir, it is usually assumed that the reservoir fluids are connected (i.e., there is a lack of compartmentalization) and in thermodynamic equilibrium (with no adsorption phenomena or any kind of chemical reactions in the reservoir). The mass flux (J) of compositional component i that crosses the boundary of an elementary volume of the porous media is expressed as:

$$J_i = \rho_i \left( \sum_{j=1}^{n} (L_{ij} \nabla_T g_j^t) + L_{ip}(\rho g - \nabla P) + L_{iq} \nabla T \right) \quad (11)$$

where
$L_{ij}$, $L_{ip}$, and $L_{iq}$ are the phenomenological coefficients,
$\rho_i$ denotes the partial density of component i,
$\rho$, g, P, T are the density, the gravitational acceleration, pressure, and temperature, respectively, and
$g_j^t$ is the contribution of component j to mass free energy of the fluid in a porous media, which can be divided into a chemical potential part $\mu_j$ and a gravitational part gz (where z is the vertical depth).

The average fluid velocity (u) is estimated by:

$$u = \frac{\sum_{j=1}^{n} J_j}{\rho} \quad (12)$$

According to Darcy's law, the phenomenological baro-diffusion coefficients must meet the following constraint:

$$\frac{k}{\eta} = \frac{\sum_{j=1}^{n} \rho_j L_{jp}}{\rho} \quad (13)$$

where k and $\eta$ are the permeability and the viscosity, respectively.

If the pore size is far above the mean free path of molecules, the mobility of the components, due to an external pressure field, is very close to the overall mobility. The mass chemical potential is a function of mole fraction (x), pressure, and temperature.

At constant temperature, the derivative of the mass chemical potential (t) has two contributions:

$$\nabla_T \mu_j = \sum_{k=1}^{n} \left( \frac{\partial \mu_j}{\partial x_k} \right)_{T,P,x_{j \neq k}} \quad (14)$$

$$\nabla x_k + \left( \frac{\partial \mu_j}{\partial P} \right)_{T,x} \nabla P$$

where the partial derivatives can be expressed in terms of EOS (fugacity coefficients):

$$\left( \frac{\partial \mu_j}{\partial x_k} \right)_{T,P,x_{j \neq k}} = \frac{RT}{M_j} \left( \frac{\partial \ln f_j}{\partial x_k} \right)_{T,P,x_{j \neq k}} \quad (15)$$

$$= \frac{RT}{M_j} \left( \frac{\delta_{jk}}{x_k} + \frac{1}{\varphi_j} \left( \frac{\partial \varphi_j}{\partial x_k} \right)_{T,P,x_{j \neq k}} \right)$$

$$\left( \frac{\partial \mu_j}{\partial P} \right)_{T,x} = \frac{\bar{v}_j}{M_j} = \frac{RT}{M_j} \left( \frac{1}{P} + \left( \frac{\partial \varphi_j}{\partial P} \right)_{T,x} \right) \quad (16)$$

where
$M_j$, $f_j$, $\phi_j$, and $v_j$ are the molecular mass, fugacity, fugacity coefficient, and partial molar volume of component j, respectively;
$x_k$ is the mole fraction of component k;
R denotes the universal gas constant; and
$\delta$ is the Kronecker delta function.

In the ideal case, the phenomenological coefficients (L) can be related to effective practical diffusion coefficients ($D_i^{eff}$):

$$L_{ii} = -\frac{M_i}{RT} D_i^{eff}. \quad (17)$$

The mass conservation for component i in an n-component reservoir fluid, which governs the distribution of the components in the porous media, is expressed as:

$$\frac{\partial \rho_i}{\partial t} + \nabla J_i = 0, \, i = 1, 2, \ldots, n. \quad (18)$$

The equation can be used to solve a wide range of problems. This is a dynamic model which is changing with time t.

Consider that the mechanical equilibrium of the fluid column has been achieved:

$$\nabla_z P = \rho g \quad (19)$$

The vertical distribution of the components can be calculated by solving the following set of equations:

$$\frac{\partial \ln f_i}{\partial z} - \frac{M_i g}{RT} + \frac{J_{i,z}}{x_i D_i^{eff}} \frac{M}{\rho M_i} - \frac{L_{iq}}{D_i^{eff}} \frac{\partial T}{\partial z} = 0, \quad (20)$$

$i = 1, 2, \ldots, n$ and $$\sum_{k=1}^{n} \left( \frac{\delta_{ik}}{x_k} + \frac{1}{\varphi_i} \frac{\partial \varphi_i}{\partial x_k} \right) \nabla_z x_k + \frac{(v_i \rho - M_i)g}{RT} + \frac{J_{i,z}}{x_i D_i^{eff}} \frac{M}{\rho M_i} - \frac{L_{iq}}{D_i^{eff}} \frac{\partial T}{\partial z} = 0 \quad (21)$$

where $J_{i,z}$ is the vertical component of the external mass flux and M is the average molecular mass. This formulation allows computation of the stationary state of the fluid column and does not require modeling of the dynamic process leading to the observed compositional distribution.

If the horizontal components of external fluxes are significant, the equations along the other axis have to be solved as well. Along a horizontal "x" axis the equations become:

$$\frac{\partial \ln f_i}{\partial x} + \frac{J_{i,x}}{x_i D_i^{eff}} \frac{M}{\rho M_i} - \frac{L_{iq}}{D_i^{eff}} \frac{\partial T}{\partial x} = 0. \quad (22)$$

The mechanical equilibrium of the fluid column $\nabla_z P = \rho g$, is a particular situation which will occur only in highly permeable reservoirs. In the general case, the vertical pressure gradient is calculated by:

$$\nabla_z P = \rho g - \frac{\nabla_z P_{Fluxes} + \nabla_z P_{Soret}}{1 + R_p} \quad (23)$$

where $R_p$ is calculated by $$R_p = RT \frac{k}{\eta} \frac{\rho}{M} \sum_{i=1}^{n} \frac{x_i}{D_i^{eff}}. \quad (24)$$

The pressure gradient contribution from thermal diffusion (so-called Soret contribution) is given by:

$$\nabla_z P_{Soret} = RT \frac{\rho}{M} \sum_{i=1}^{n} x_i \frac{L_{iq}}{D_i^{eff}} \nabla_z T. \quad (25)$$

And the pressure gradient contribution from external fluxes is expressed as:

$$\nabla_z P_{Fluxes} = RT \sum_{i=1}^{n} \frac{J_{i,z}}{M_i D_i^{eff}}. \quad (26)$$

Assuming an isothermal reservoir and ignoring the external flux, results in the following equation:

$$\frac{\partial \ln f_i}{\partial z} - \frac{M_i g}{RT} = 0, i = 1, 2, \ldots, n. \quad (27)$$

Eq. (27) can be rewritten as:

$$\frac{\partial \ln f_i}{\partial z} - \frac{M_i g}{RT} + a_i = 0, i = 1, 2, \ldots, n. \quad (28)$$

where $a_i$ is computed by:

$$a_i = \frac{J_{i,z}}{x_i D_i^{eff}} \frac{M}{\rho M_i} - \frac{L_{iq}}{D_i^{eff}} \frac{\partial T}{\partial z}, i = 1, 2, \ldots, n. \quad (29)$$

The first part of the $a_i$ term of Eq. (29) can be simplified to:

$$\frac{J_{i,z}}{x_i \rho D_i^{eff}}. \quad (30)$$

The second part of the $a_i$ term of Eq. (29) can be written in the form proposed by Haase in "Thermodynamics of Irreversible Processes," Addison-Wesley, Chapter 4, 1969. In this manner, $a_i$ is computed by:

$$a_i = \frac{J_{i,z}}{x_i \rho D_i^{eff}} + M_i \left( \frac{H_m}{M_m} - \frac{H_i}{M_i} \right) \frac{\Delta T}{T}, i = 1, 2, \ldots, n \quad (31)$$

where $H_i$ is the partial molar enthalpy for component i, $H_m$ is the molar enthalpy for the mixture, $M_i$ is the molecular mass for component i, $M_m$ is the molecular mass for the mixture, T is the formation temperature, and $\Delta T$ is the temperature between two vertical depths.

The first part of the $a_i$ term of Eqs. (29) and (30) accounts for external fluxes in the reservoir fluid. It can be ignored if a steady-state is assumed. The second part of the $a_i$ term of Eqs. (29) and (31) accounts for a temperature gradient in the reservoir fluid. It can be ignored if an isothermal reservoir is assumed.

The fugacity $f_i$ of component i at a given depth can be expressed as function of the fugacity coefficient and mole fraction for the component i and reservoir pressure (P) at the given depth as:

$$f_i = \phi_i x_i P. \quad (32)$$

The mole fractions of the components at a given depth must further sum to 1 such that $$\sum_{i=1}^{n} x_i = 1$$

at a given depth. Provided the mole fractions and the reservoir pressure and temperature are known at the reference station, these equations can be solved for mole fractions (and mass fractions), partial molar volumes and volume fractions for the reservoir fluid components and pressure and temperature as a function of depth. Flash calculations can solve for fugacities of components that form at equilibrium. Details of suitable flash calculations are described by Li in "Rapid Flash Calculations for Compositional Simulation," *SPE Reservoir Evaluation and Engineering*, October 2006, incorporated herein by reference in its entirety. The flash equations are based on a fluid phase equilibria model that finds the number of phases and the distribution of species among the phases, that minimizes Gibbs free energy. More specifically, the flash calculations calculate the equilibrium phase conditions of a mixture as a function of pressure, temperature, and composition. The fugacities of the components derived from such flash calculations can be used to solve for the compositional gradient (component concentrations) of the reservoir fluid as a function of depth.

In step 205, the predictions of compositional gradient can be used to predict properties of the reservoir fluid as a function of depth (typically referred to as a property gradient), as is well known. For example, the predictions of compositional gradient can be used to predict bubble point pressure, dew point pressure, live fluid molar volume, molecular weight, gas-oil ratio, live fluid density ($\rho$), live fluid viscosity ($\mu$), stock tank oil density, and other pressure-volume-temperature (PVT) properties as a function of depth in the reservoir, as is well known in the art.

In step 207, the downhole tool 10 of FIGS. 1A and 1B is used to obtain a sample of the formation fluid at the reservoir pressure and temperature (live oil sample) at another measurement station in the wellbore, and the downhole fluid analysis as described above with respect to step 201 is performed on this sample. In an illustrative embodiment, the fluid analysis module 25 provides measurements of the concentrations (e.g., weight percentages) of carbon dioxide ($CO_2$), methane ($CH_4$), ethane ($C_2H_6$), the C3-C5 alkane group including propane, butane, pentane, the lump of hexane and heavier alkane components (C6+), and asphaltene content. The downhole tool 10 also preferably provides a means to measure temperature of the fluid sample (and thus reservoir temperature at the station), pressure of the fluid sample (and thus reservoir pressure at the station), live fluid density of the fluid sample, live fluid viscosity of the fluid sample, gas-oil ratio (GOR) of the fluid sample, optical density, and possibly other fluid parameters (such as API gravity and formation volume fraction ($B_O$)) of the fluid sample. For example, concentrations of the gas phase components and the liquid phase components output by the EOS model as a function of depth in the reservoir can be used to predict GOR as a function of depth in the reservoir, as is well known.

Optionally, in step 209 the EOS model of step 205 can be tuned based on a comparison of the compositional and fluid property predictions derived by the EOS model of step 205 and the compositional and fluid property analysis of the DFA tool in step 207. Laboratory data can also be used to tune the EOS model. Such tuning typically involves selecting parameters of the EOS model in order to improve the accuracy of the predictions generated by the EOS model. EOS model parameters that can be tuned include critical pressure, critical temperature, and acentric factor for single carbon components, binary interaction coefficients, and volume translation parameters. An example of EOS model tuning is described in Reyadh A. Almehaideb et al., "EOS tuning to model full field crude oil properties using multiple well fluid PVT analysis," Journal of Petroleum Science and Engineering, Volume 26, Issues 1-4, pgs. 291-300, 2000, incorporated herein by reference in its entirety. In the event that the EOS model is tuned, the compositional and fluid property predictions of step 205 can be recalculated from the tuned EOS model.

In step 211, the predictions of compositional gradients generated in step 205 (or in step 209 in the event that EOS is tuned) are used to derive solubility parameters for the solvent part (and possibly other property gradients or solubility model inputs) as a function of depth in the reservoir. For example, the predictions of compositional gradients can be used to derive the density of the solvent part (Eq. (2)), the molar volume of the solvent part (Eq. (3)), and the solubility parameter of the solvent part (Eq. (4) or (5)) as a function of depth.

In step 213, a Flory-Huggins-Zuo type solubility model as described above with respect to Eq. (1) is used to generate a family of curves that predict the concentration of one or more solute part classes as a function of depth in the reservoir. The curves are based upon the property gradients generated in step 205 (or in step 209 in the event that the EOS model is tuned) and the solubility parameters generated in step 211.

For each respective solute part class, the family of curves derived in step 213 are compared to measurements of concentration for the respective solute part class (derived from color measurements by downhole fluid analysis as described above) at corresponding depths in step 215. The comparisons are evaluated to identify the solute part class that best satisfies a predetermined matching criterion. Details of exemplary operations that employ a Flory-Huggins-Zuo type EOS model to generate a family of curves that predict the concentration of one or more solute part classes as a function of depth in the reservoir and that identify the solute part class (if any) that best satisfies a predetermined matching criterion are described in International Patent Application WO 2011/030243, incorporated herein by reference in its entirety. One or more solute part classes that satisfy the predetermined matching criterion are then evaluated to determine the best matching solute part class. The evaluation provides an indication that the reservoir fluids are in thermal equilibrium within a non-compartmentalized reservoir and an indication of the particular solute part class (and thus the assumption of composition underlying the particular solute part class) that is the best match to the measured gradient for the solvent part high molecular weight fraction. In the event that there is only one particular matching solute part class, step 215 can provide an indication that that the reservoir fluids are in thermal equilibrium within a non-compartmentalized reservoir and an indication of the one particular matching solute part class matches to the measured gradient for the solvent part high molecular weight fraction.

The best matching curve provides a concentration profile of asphaltene pseudocomponents (e.g., resin or asphaltene molecules, asphaltene nanoaggregates, larger asphaltene clusters, and combinations thereof) and corresponding aggregate size of asphaltenes as a function of depth in the reservoir. The asphaltene concentration profile dictated by the best matching curve can be used to predict gradients for fluid properties (such as fluid density and fluid viscosity) that relate to asphaltene content. For predicting viscosity, the predictions can be based on the empirical correlation of the form proposed by Lohrenz, Bray, and Clark in "Calculating Viscosity of Reservoir Fluids from their Composition," *Journal of Petroleum Technology*, October 1964, pp. 1171-1176, or the empirical correlation of the form proposed by Pedersen et al. in "Viscosity of Crude Oils," *Chemical Engineering Science*, Vol. 39, No. 6, pp. 1011-1016, 1984.

In steps 217-235, operations are performed that are specific to the particular best-matching solute part class identified in step 215. In an illustrative embodiment, the solute part classes can include the following:

i) a solute part class including resin or asphaltene molecules (with little or no asphaltene nanoaggregates and clusters);

ii) a solute part class including asphaltene nanoaggregates (with little or no resin or asphaltene molecules and asphaltene clusters);

iii) a solute part class including resin or asphaltene molecules and asphaltene nanoaggregates (with little or no asphaltene clusters); and iv) a solute part class including asphaltene clusters (with little or no resin or asphaltene molecules and asphaltene nanoaggregates).

In this illustrative embodiment, the result of the evaluation of step 215 is analyzed to determine if the best matching solute part class includes resin or asphaltene molecules (with little or no asphaltene nanoaggregates and clusters). If this is the case, the operations continue to step 219. Otherwise the operations continue to step 221.

In step 219, the workflow infers a likelihood that the reservoir fluids are in a state of thermodynamic equilibrium within a non-compartmentalized (connected) reservoir, and the reservoir fluids include resin or asphaltene molecules (with little or no asphaltene nanoaggregates or asphaltene clusters) in accordance with assumptions underlying the best matching solute part. In this case, the reservoir fluid likely includes condensates with a very small concentration of asphaltenes. Essentially, the high content of dissolved gas and light hydrocarbons create a very poor solvent for asphaltenes. Moreover, processes that generate condensates do not tend to generate asphaltenes. Consequently, there is very little crude oil color as determined by DFA in the near-infrared. Nevertheless, there are asphaltene-like molecules—the resins—that absorb visible light and at times even some near-infrared light. These resin molecules are largely dispersed in the condensate as molecules—thereby reducing the impact of the gravitational term. In addition, condensates exhibit considerable gradients. Since condensates are compressible, the hydrostatic head pressure of the condensate column generates a density gradient in the column. The density gradient creates the driving force to create a chemical composition gradient. The lower density components tend to rise in the column while the higher density components tend to settle down in the column. This GOR gradient gives rise to a large solubility contrast for the resin or asphaltene molecules, thereby producing significant DFA color gradients. These gradients are useful to check for reservoir connectivity. Accordingly, the GOR gradient as determined by DFA analysis can be evaluated for reservoir analysis. The predicted and/or measured concentration of the resin component as a function of depth can also be evaluated for reservoir analysis. More specifically, non-compartmentalization (connectivity) can be indicated by moderately decreasing GOR values with depth, a continuous increase of resin content as a function of depth, and/or a continuous increase of fluid density and/or fluid viscosity as a function of depth. On the other hand, compartmentalization and/or non-equilibrium conditions can be indicated by discontinuous GOR (or if lower GOR is found higher in the column), discontinuous resin content (or if higher asphaltene content is found higher in the column), and/or discontinuous fluid density and/or fluid viscosity (or if higher fluid density and/or fluid viscosity is found higher in the column).

In step 221, the result of the evaluation of step 215 is analyzed to determine if the best matching solute part class includes asphaltene nanoaggregates (with little or no resin or asphaltene molecules and asphaltene clusters). If this is the case, the operations continue to step 223. Otherwise the operations continue to step 225.

In step 223, the workflow infers a likelihood that the reservoir fluids are in a state of thermodynamic equilibrium within a non-compartmentalized (connected) reservoir, and the reservoir fluids include asphaltene nanoaggregates (with little or no resin or asphaltene molecules and asphaltene clusters) in accordance with assumptions underlying the best matching solute part class. In this case, the predicted and/or measured concentration of asphaltene nanoaggregates as a function of depth can be evaluated for reservoir analysis. More specifically, non-compartmentalization (connectivity) can be indicated by a continuous increase of asphaltene nanoaggregate content as a function of depth, and/or a continuous increase of fluid density and/or fluid viscosity as a function of depth. On the other hand, compartmentalization and/or non-equilibrium conditions can be indicated by discontinuous GOR (or if lower GOR is found higher in the column), discontinuous asphaltene nanoaggregate content (or if higher asphaltene nanoaggregate content is found higher in the column), and/or discontinuous fluid density and/or fluid viscosity (or if higher fluid density and/or fluid viscosity is found higher in the column).

In step 225, the result of the evaluation of step 215 is analyzed to determine if the best matching solute part class includes a mixture of resin or asphaltene molecules and asphaltene nanoaggregates (with little or no asphaltene clusters). If this is the case, the operations continue to step 227. Otherwise the operations continue to step 229.

In step 227, the workflow infers a likelihood that the reservoir fluids are in a state of thermodynamic equilibrium within a non-compartmentalized (connected) reservoir, and the reservoir fluids include a mixture of resin or asphaltene molecules and asphaltene nanoaggregates (with little or no asphaltene clusters) in accordance with assumptions underlying the best matching solute part class. In this case, the predicted and/or measured concentration of the mixture of resin or asphaltene molecules and asphaltene nanoaggregates as a function of depth can be evaluated for reservoir analysis. More specifically, non-compartmentalization (connectivity) can be indicated by a continuous increase of the concentration of the resin/asphaltene nanoaggregate mixture as a function of depth, and/or a continuous increase of fluid density and/or fluid viscosity as a function of depth. On the other hand, compartmentalization and/or non-equilibrium conditions can be indicated by discontinuous GOR (or if lower GOR is found higher in the column), discontinuous concentration of the resin/asphaltene nanoaggregate mixture (or if a higher concentration of the resin/asphaltene nanoaggregate mixture is found higher in the column), and/or discontinuous fluid density and/or fluid viscosity (or if higher fluid density and/or fluid viscosity is found higher in the column).

In step 229, the result of the evaluation of step 215 is analyzed to determine if the best matching solute part class includes asphaltene clusters (with little or no resin or asphaltene molecules and asphaltene nanoaggregates). If this is the case, the operations continue to step 231. Otherwise the operations continue to step 233.

In step 231, the workflow infers a likelihood that the reservoir fluids are in a state of thermodynamic equilibrium within a non-compartmentalized (connected) reservoir, and the reservoir fluids include asphaltene clusters in accordance with assumptions underlying the best matching solute part class. In this case, the predicted and/or measured concentration of the asphaltene clusters as a function of depth can be evaluated for reservoir analysis. More specifically, non-compartmentalization (connectivity) can be indicated by a continuous increase of asphaltene cluster content as a function of depth, and/or a continuous increase of fluid density and/or fluid viscosity as a function of depth. On the other hand, compartmentalization and/or non-equilibrium conditions can be indicated by discontinuous GOR (or if lower GOR is found higher in the column), discontinuous asphaltene cluster content (or if higher asphaltene cluster content is found higher in the column), and/or discontinuous fluid density and/or fluid viscosity (or if higher fluid density and/or fluid viscosity is found higher in the column) Moreover, because asphaltene clusters are expected in the oil column, it is anticipated that:

large density and viscosity gradients exist in the oil column;

the oil may have flow assurance problems (due to instability from e.g., the asphaltene onset pressure being equal to or greater than the formation pressure or bitumen in the formation); and there may be an allochthonous tar mat in the reservoir (as opposed to a autochthonous tar mat formed from biodegradation).

In step 233, the evaluation of step 215 has determined that no suitable match has been found between the solubility curves and the measured properties. In this case, the operations can determine if there is a need for additional measurement stations and/or different methodologies for repeat processing and analysis in order to improve the confidence level of the measured and/or predicted fluid properties. For example, the measured and/or predicted properties of the reservoir fluid can be compared to a database of historical reservoir data to determine the measured and/or predicted properties make sense. If the data does not make sense, additional measurement station(s) and/or different methodologies (e.g., different model(s)) can be identified for repeat processing and analysis in order to improve the confidence level of the measured and/or predicted fluid properties. This may be accomplished by a quantitative consistency check between various downhole fluid analysis measurements such as color, GOR, density, and viscosity, as described in U.S. patent application Ser. No. 12/752,967, incorporated herein by reference in its entirety.

If in step 233 there is a need for additional measurement stations and/or different methodologies, the operations continue to step 235 to repeat the appropriate processing and analysis in order to improve the confidence level of the measured and/or predicted fluid properties.

If in step 233, there is no need for additional measurement stations and/or different methodologies (in other words, there is sufficient confidence level in the measured and/or predicted fluid properties), the operations continue to steps 237 and 239 where the reservoir architecture is determined to be compartmentalized and in a state of thermodynamic equilibrium, or non-compartmentalized but in a state of thermodynamic non-equilibrium. Such a determination is supported by the invalidity of the assumptions of reservoir connectivity and thermal equilibrium that underlie the models utilized for predicting the solute part property gradient within the wellbore. The operations of steps 237 and 239 are carried out to distinguish between these two architectures (compartmentalized and in a state of thermodynamic equilibrium (step 237) versus non-compartmentalized and in a state of thermodynamic non-equilibrium (step 239)).

In step 237, the workflow investigates the likelihood that the reservoir is compartmentalized. Specific examples of operations for carrying out the investigation of step 237 are illustrated in FIG. 3 and described below in detail.

Figure 4:
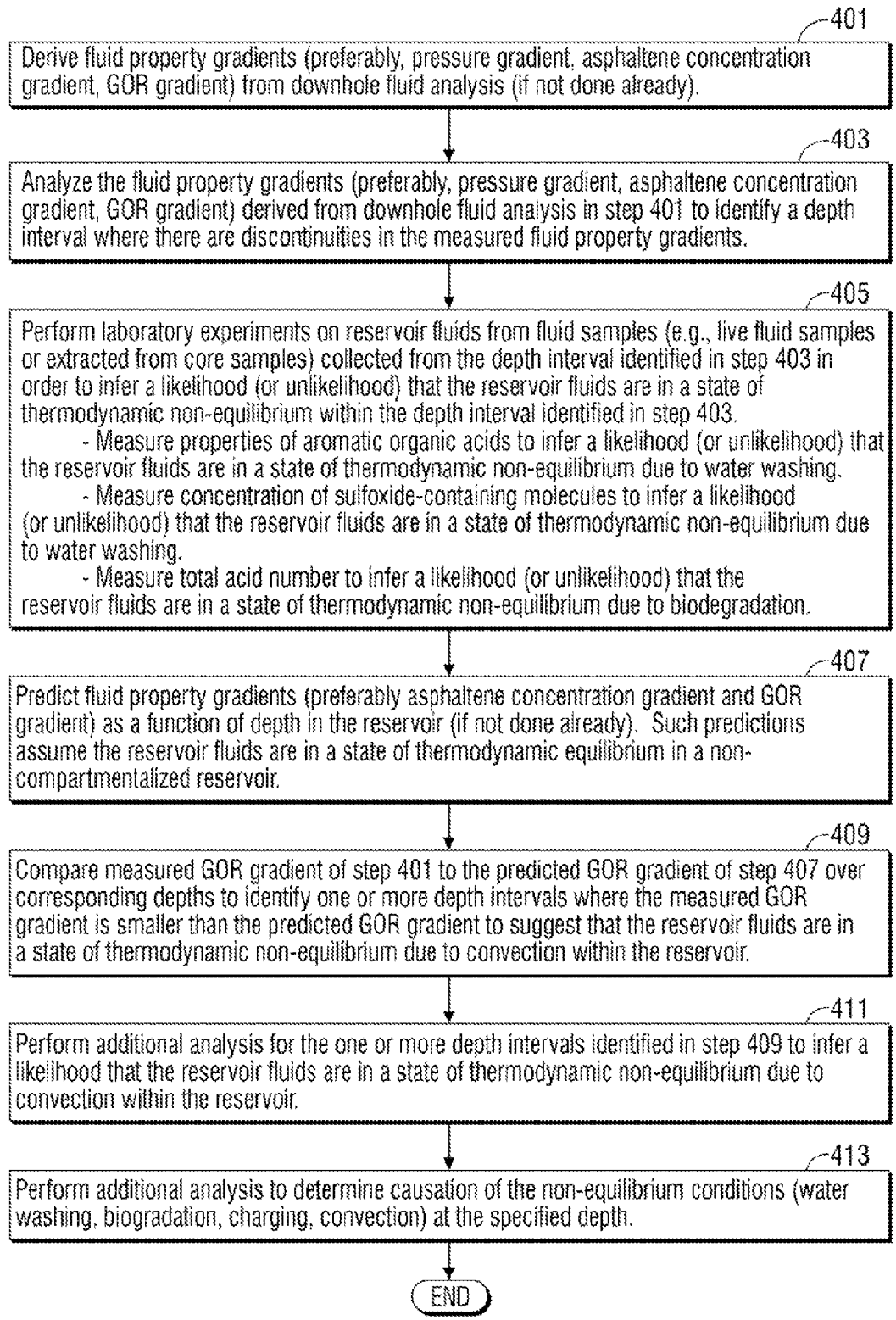
FIG. 4 is a flow chart of operations that are carried out as part of the data analysis of FIGS. 2A-2D in order to investigate lack of thermodynamic equilibrium of the reservoir fluids.

In step 239, the workflow investigates the likelihood that the reservoir fluids are in a state of thermodynamic non-equilibrium in a non-compartmentalized (connected) reservoir. Specific examples of operations for carrying out the investigation of step 239 are illustrated in FIG. 4 and described below in detail.

Subsequent to the investigation of reservoir architecture in steps 219, 223, 227, 231, 237, and 239, the results of such investigations are reported to interested parties in step 241. The characteristics of the reservoir architecture reported in step 241 can be used to model and/or understand the reservoir of interest for reservoir assessment, planning and management.

Figure 3:
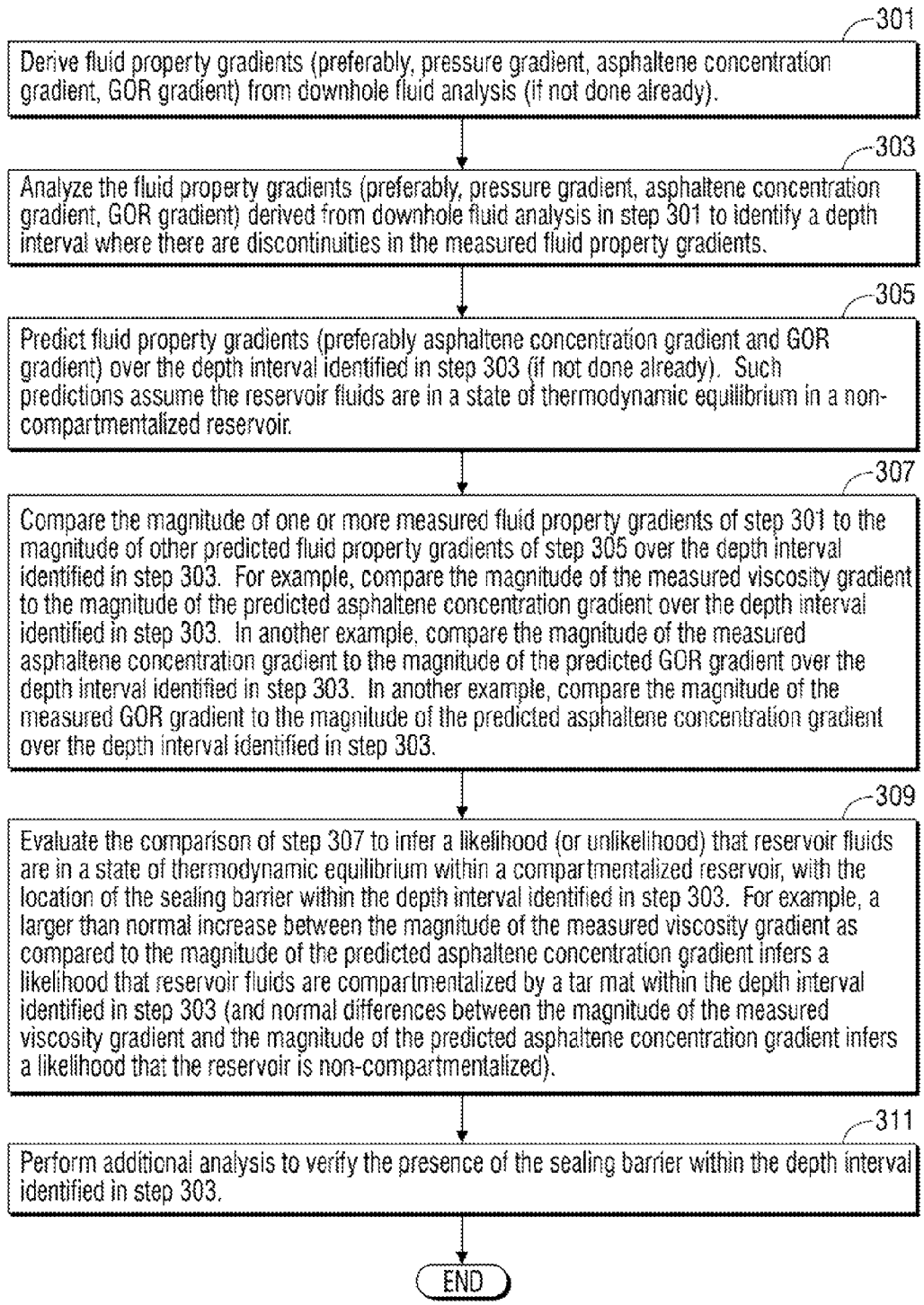
FIG. 3 is a flow chart of operations that are carried out as part of the data analysis of FIGS. 2A-2D in order to investigate compartmentalization of the reservoir.

FIG. 3 illustrates operations for investigating the likelihood that the reservoir is compartmentalized. The operations begin in step 301 where fluid property gradients as a function of depth in the reservoir are derived from the downhole fluid analysis of steps 201 and 207, if not done already. In step 303, the fluid property gradients of step 301 are analyzed to identify a depth interval where there are discontinuities (e.g., significantly large changes beyond those normally expected for non-compartmentalized reservoirs in a state of thermodynamic equilibrium) in such fluid property gradients. This depth interval is referred to below as the depth interval of interest for steps 303-311. In the preferred embodiment, the fluid property gradients of steps 301 and 303 include a pressure gradient (e.g., fluid pressure measured by the downhole fluid analysis tool at multiple measurement stations within the reservoir), asphaltene concentration gradient (e.g., asphaltene concentration derived from the color measured by the downhole fluid analysis tool at multiple measurement stations within the reservoir), fluid viscosity gradient (e.g., live fluid viscosity ($\mu$) measured by the downhole fluid analysis tool at multiple measurement stations within the reservoir), fluid density gradient, and a GOR gradient (e.g., GOR measured by the downhole fluid analysis tool at multiple measurement stations within the reservoir). Other suitable fluid property gradients can also be derived and analyzed for discontinuities. If need be, the operations of steps 301 and 303 can involve downhole fluid sampling and analysis at additional measurement stations in the wellbore in order to derive the fluid property gradients and associated discontinuous depth interval with an accuracy suitable for analysis.

In step 305, fluid property gradients are predicted over the depth interval of interest, if not done already. Such fluid property gradients can be based upon an EOS model or a solubility model as described above or another suitable predictive model. Such predictive models assume that the reservoir fluids are in a state of thermodynamic equilibrium in a non-compartmentalized reservoir. In the preferred embodiment, the fluid property gradients predicted in step 305 include an asphaltene concentration gradient (preferably predicted by a Flory-Huggins-Zuo type solubility model as described above) and a GOR gradient (preferably predicted by the EOS model as described above). In the preferred embodiment, the predicted asphaltene gradient is set to a constant value typical of the best-fit high molecular weight fraction class (the best-fit solute class) of the Flory-Huggins-Zuo type solubility model. Other suitable fluid property gradients can be predicted as well.

In step 307, the magnitude of one or more of the measured fluid property gradients of step 301 is compared to the magnitude of other predicted fluid property gradients of step 305 over the depth interval of interest. For example, the magnitude of the measured fluid viscosity gradient of step 301 can be compared to the magnitude of the predicted asphaltene concentration gradient of step 305 over the depth interval of interest. In another example, the magnitude of the measured asphaltene concentration gradient of step 301 can be compared to the magnitude of the predicted GOR gradient of step 305 over the depth interval of interest. In another example, the magnitude of the measured GOR gradient of step 301 can be compared to the magnitude of the predicted asphaltene concentration gradient of step 303 over the depth interval of interest. In yet another example, the magnitude of the measured density gradient can be compared to the magnitude of the predicted GOR gradient of step 305 over the depth interval of interest.

In step 309, the comparison(s) of step 307 are evaluated to infer a likelihood (or unlikelihood) that reservoir fluids are in a state of thermodynamic equilibrium within a compartmentalized reservoir, with the location of the sealing barrier within the depth interval of interest. For example, significantly larger than normal increases between the magnitude of the measured viscosity gradient of step 301 and the magnitude of the predicted asphaltene concentration gradient (and/or predicted GOR gradient) of step 305 over the depth interval of interest infers a likelihood that reservoir fluids are compartmentalized by a tar mat within the depth interval of interest. For example, a viscosity gradient where the viscosity increases by an order of magnitude is significantly larger than normal where the predicted asphaltene content increases by less than ten percent. Conversely, normal differences between the magnitude of the measured viscosity gradient of step 301 and the magnitude of the predicted asphaltene concentration gradient (and/or predicted GOR gradient) of step 305 over the depth interval of interest infers a likelihood that the reservoir is non-compartmentalized within the depth interval of interest. In another example, significantly larger than normal increases between the magnitude of the measured asphaltene concentration gradient of step 301 and the magnitude of the predicted GOR gradient of step 305 over the depth interval of interest infers a likelihood that reservoir fluids are compartmentalized by a tar mat within the depth interval of interest. Conversely, normal differences between the magnitude of the measured asphaltene concentration gradient of step 301 and the magnitude of the GOR gradient of step 305 over the depth interval of interest infers a likelihood that the reservoir is non-compartmentalized over the depth interval of interest. In yet another example, significantly larger than normal increases between the magnitude of the measured GOR gradient of step 301 and the magnitude of the predicted asphaltene concentration gradient of step 305 over the depth interval of interest infers a likelihood that reservoir fluids are compartmentalized by a tar mat within the depth interval of interest. Conversely, normal differences between the magnitude of the measured GOR gradient of step 301 and the magnitude of the predicted asphaltene concentration gradient of step 305 over the depth interval of interest infers a likelihood that the reservoir is non-compartmentalized over the depth interval of interest.

In step 311, additional analysis can be performed to verify the presence of a sealing barrier within the depth interval of interest. For example, as part of step 311 particular downhole fluid sampling and analysis of reservoir fluids within the depth interval of interest can be used to measure asphaltene content of the reservoir fluids (based on color) and thus verify the heavy concentrations of asphaltenes (a tar mat) within the specific depth interval. In another example, particular laboratory fluid analysis (such as SARA analysis) can be performed on fluids extracted from core samples taken from the depth interval of interest in order to measure asphaltene content of the reservoir fluids and thus verify the heavy concentrations of asphaltenes (a tar mat) within the specific depth interval. In another example, well logging (such as gamma ray logging) can be carried out and analyzed to verify the presence of a sealing barrier within the depth interval of interest, as is well known in the art. In another example, the rock properties of the reservoir can be analyzed (e.g., by geologic modeling (or geophysical modeling) of the reservoir) in order to identify structural features (such as a fault or fracture) in the area of the depth interval of interest in order to verify the presence of a sealing barrier in such depth interval. Geologic and/or geophysical modeling and analysis of the reservoir can be carried out with suitable modeling software, such as the Petrel modeling software available from Schlumberger Technology Corporation. In yet another example, fluid may be pumped into or withdrawn from the reservoir at one location using the MDT formation evaluation tool, available from Schlumberger Technology Corporation, while monitoring the pressure change at another location in the reservoir. If moving fluid in the first location causes a pressure change in the second location, the locations are determined to be in the same reservoir compartment.

FIG. 4 illustrates operations for investigating the likelihood that the reservoir is non-compartmentalized (connected) but in a state of thermodynamic non-equilibrium. The operations begin in step 401 where fluid property gradients as a function of depth in the reservoir are derived from the downhole fluid analysis of steps 201 and 207, if not done already. In step 403, the fluid property gradients of step 401 are analyzed to identify a depth interval where there are discontinuities (e.g., significantly large changes beyond those normally expected for non-compartmentalized reservoirs in a state of thermodynamic equilibrium) in such fluid property gradients. This depth interval is referred to below as the depth interval of interest for steps 403 and 405. In the preferred embodiment, the fluid property gradients of steps 401 and 403 include a pressure gradient (e.g., fluid pressure measured by the downhole fluid analysis tool at multiple measurement stations within the reservoir), asphaltene concentration gradient (e.g., asphaltene concentration derived from the color measured by the downhole fluid analysis tool at multiple measurement stations within the reservoir), fluid viscosity gradient (e.g., live fluid viscosity ($\mu$) measured by the downhole fluid analysis tool at multiple measurement stations within the reservoir), density gradient, and a GOR gradient (e.g., GOR measured by the downhole fluid analysis tool at multiple measurement stations within the reservoir). Other suitable fluid property gradients can also be derived and analyzed for discontinuities. If need be, the operations of steps 401 and 403 can involve downhole fluid sampling and analysis at additional measurement stations in the wellbore in order to derive the fluid property gradients and associated discontinuous depth interval with an accuracy suitable for analysis.

In step 405, laboratory experiments are carried out on reservoir fluids from fluid samples (e.g., live fluid samples or fluids extracted from core samples) collected from the depth interval of interest in order to infer a likelihood (or unlikelihood) that the reservoir fluids are in a state of thermodynamic non-equilibrium within the depth interval of interest.

The laboratory experiments of step 405 can measure one or more properties of aromatic organic acids over the depth interval of interest to infer a likelihood (or unlikelihood) that the reservoir fluids are in a state of thermodynamic non-equilibrium within the depth interval of interest due to water washing. Aromatic organic acids can be analyzed by several variations of gas chromatography and/or high resolution versions of mass spectrometry. The solubility of aromatic organic acids in water generally increases with lower molecular weight, higher degree aromaticity, and higher number of acid groups. Identification of a discrete change in the molecular weight, degree of aromaticity, and/or number of acid groups in the aromatic organ acid fraction of the analyzed fluid samples occurring within the depth interval of interest at a location similar to the location of the discontinuity in the fluid property gradient (particularly, a discontinuity in the concentration of asphaltene) of step 403 infers a likelihood that the reservoir fluids are in a state of thermodynamic non-equilibrium within the depth interval of interest due to water washing. Conversely, the absence of any discrete changes in the molecular weight, degree of aromaticity, and/or number of acid groups in the aromatic organ acid fraction of the analyzed fluid samples occurring within the depth interval of interest infers a non-likelihood that the reservoir fluids are in a state of thermodynamic non-equilibrium within the depth interval of interest due to water washing. Changes (or lack of changes) to other properties of aromatic organic acids over the depth interval of interest can also be used to infer a likelihood (or unlikelihood) that the reservoir fluids are in a state of thermodynamic non-equilibrium within the depth interval of interest due to water washing.

The laboratory experiments of step 405 can also measure the concentration of sulfoxide-containing molecules over the depth interval of interest to infer a likelihood (or unlikelihood) that the reservoir fluids are in a state of thermodynamic non-equilibrium within the depth interval of interest due to water washing. Sulfoxide is a highly oxidized form of sulfur, and such oxidation is likely to occur if oxygen-containing waters pass through the reservoir. Concentration of sulfoxide-containing molecules can be measured by several variations of gas chromatography, high resolution versions of mass spectrometry, and/or X-ray spectroscopy. Identification of a discrete change in the concentration of sulfoxide-containing molecules in the analyzed fluid samples occurring within the depth interval of interest at a location similar to the location of the discontinuity in the fluid property gradient (particularly, a discontinuity in the concentration of asphaltene) of step 403 infers a likelihood that the reservoir fluids are in a state of thermodynamic non-equilibrium within the depth interval of interest due to water washing. Conversely, the absence of any discrete changes in the concentration of sulfoxide-containing molecules in the analyzed fluid samples occurring within the depth interval of interest infers a non-likelihood that the reservoir fluids are in a state of thermodynamic non-equilibrium within the depth interval of interest due to water washing. Changes (or lack of changes) to other properties of sulfoxide-containing molecules over the depth interval of interest can also be used to infer a likelihood (or unlikelihood) that the reservoir fluids are in a state of thermodynamic non-equilibrium within the depth interval of interest due to water washing.

The laboratory experiments of step 405 can also measure the total acid number (TAN) over the depth interval of interest to infer a likelihood (or unlikelihood) that the reservoir fluids are in a state of thermodynamic non-equilibrium within the depth interval of interest due to biodegradation. TAN can be measured by titration or other suitable methods well known in the art. High TAN is likely to occur in biodegraded oils. Identification of a discrete change in the TAN of the analyzed fluid samples occurring within the depth interval of interest at a location similar to the location of the discontinuity in the fluid property gradient (particularly, a discontinuity in the concentration of asphaltene) of step 403 infers a likelihood that the reservoir fluids are in a state of thermodynamic non-equilibrium within the depth interval of interest due to biodegradation. Conversely, the absence of any discrete changes in the TAN of the analyzed fluid samples occurring within the depth interval of interest infers a non-likelihood that the reservoir fluids are in a state of thermodynamic non-equilibrium within the depth interval of interest due to biodegradation. Changes (or lack of changes) to other acid-related properties of the analyzed fluid samples over the depth interval of interest can also be used to infer a likelihood (or unlikelihood) that the reservoir fluids are in a state of thermodynamic non-equilibrium within the depth interval of interest due to biodegradation. Additionally, biodegradation can be identified by looking for biomarkers known to be indicative of biodegradation, for example 25-norhopanes. This analysis can be performed by gas chromatography and/or high resolution mass spectroscopy.

In step 407, fluid property gradients are predicted as a function of depth in the reservoir, if not done already. Such fluid property gradients can be based upon an EOS model or a solubility model as described above or another suitable predictive model. Such predictive models assume that the reservoir fluids are in a state of thermodynamic equilibrium in a non-compartmentalized reservoir. In the preferred embodiment, the fluid property gradients predicted in step 407 include an asphaltene concentration gradient (preferably predicted by a Flory-Huggins-Zuo type EOS model as described above) and a GOR gradient (preferably predicted by the EOS model as described above). In the preferred embodiment, the predicted asphaltene concentration gradient is set to a constant value typical of the best-fit high molecular weight fraction class (the best-fit solute class) of the Flory-Huggins-Zuo type solubility model.

In step 409, the measured GOR gradient of step 401 is compared to the predicted GOR gradient of step 407 over corresponding depths to identify one or more depth intervals where the measured GOR gradient is smaller than the predicted GOR gradient. Identification of a measured GOR gradient smaller than the predicted GOR gradient suggests that the reservoir fluids are in a state of thermodynamic non-equilibrium due to convection within the reservoir, because convection serves to mix the reservoir fluids.

In step 411, additional analysis can be performed for the one or more depth intervals identified in 409 to infer a likelihood that the reservoir fluids are in a state of thermodynamic non-equilibrium due to convection within the reservoir. Convection serves to decrease the magnitude of the asphaltene concentration gradient in the reservoir fluids. Thus, as part of the analysis of step 411, the measured asphaltene concentration gradient of step 401 can be compared to the predicted asphaltene concentration gradient of step 407 over the depth interval(s) identified in step 409 where the measured GOR gradient is smaller than the predicted GOR gradient. Alternatively, laboratory SARA analysis on fluid samples (e.g., live fluid samples or fluid samples extracted from core samples) collected from the depth interval identified in step 409 can be carried out to measure the asphaltene concentration gradient over the specific depth interval(s). In the event that the measured asphaltene concentration gradient is smaller than the predicted asphaltene concentration gradient, a likelihood that the reservoir fluids are in a state of thermodynamic non-equilibrium due to convection within the reservoir is inferred.

In step 413, additional analysis can be performed for the one or more depth intervals identified in 409 to determine causation of the non-equilibrium conditions (water washing, biodegradation, charging, convection) at the specified depth as dictated by the earlier analysis (steps 401-411).

Water washing occurs when rain (referred to as "meteoric water") filters through the reservoir. In principle, one can look for water washing by looking at a seismic survey and identifying a high permeability layer than extends from the reservoir to a nearby ocean or other large source of water. Ordinarily, however, assessing oil chemistry is the best way to identify water washing.

Living microorganisms (primarily bacteria, but also yeasts, molds, and filamentous fungi) can alter and/or metabolize various classes of compounds present in oil, a set of processes collectively called oil biodegradation. Oil biodegradation typically raises oil viscosity (which reduces oil producibility) and reduces oil API gravity (which reduces the value of the produced oil). Most oil biodegradation occurs near an oil-water contact. Moreover, since the time scale of biodegradation is often similar to the time scale of reservoir charging, a biodegraded oil column may consist of a primary charge of oil that arrived first in the reservoir and one or more subsequent charges of oil that arrived later. The primary charge may be more biodegraded than the secondary charge, since the primary charge has been subjected to in-reservoir biodegradation for a longer period of time. Therefore, depending on the migration pathways into the reservoir, spatial variations in the relative abundance of the primary and secondary charges may cause variations in the oil fluid properties (e.g., API gravity and viscosity). Thus, additional analysis, such as basin modeling in combination with well logging, laboratory biomarker analysis, and laboratory TAN analysis can be carried out to understand the spatial distribution of the charging over the reservoir and the spatial distribution of biodegradation across the reservoir.

Charging is caused by a zone of hydrocarbons migrating into the reservoir, typically through a fault or fracture. It is possible to detect gas migrating through faults (often referred to as "gas chimneys"), and if a gas chimney is identified approaching the reservoir, charging is taking place.

Convection in the reservoir fluids can be caused by a large temperature gradient. Thus, as part of the analysis of step 413, distributed temperature measurements can be carried out over the depth interval(s) identified in step 409 to measure the temperature gradient over the specific depth interval(s). In the event that the measured temperature gradient is large, a likelihood that the reservoir fluids are in a state of thermodynamic non-equilibrium due to convection within the reservoir is inferred. Convection in the reservoir fluids can also be caused by a current gas charge into the reservoir. Thus, as part of the analysis of step 411, suitable data analysis (such as seismic imaging and well logging) can be carried out to verify the presence of a gas change over the depth interval(s) identified in step 409.

Advantageously, the workflow of the present invention provides operations that investigate and distinguish between non-compartmentalization of the reservoir, compartmentalization of the reservoir, and lack of thermodynamic equilibrium in the reservoir.

Non-compartmentalization of the reservoir is preferably investigated by matching the predicted concentration of heavy fractions (e.g., asphaltenes) to the concentration of the heavy fraction derived from downhole fluid analysis.

Compartmentalization of the reservoir is investigated by analyzing fluid property gradients (preferably a pressure gradient, asphaltene concentration gradient, and GOR gradient) derived from downhole fluid analysis to identify one or more localized areas of the reservoir where there are discontinuities in such fluid property gradients. In each localized area, the magnitude of one or more fluid property gradients derived from downhole fluid analysis is compared to the magnitude of other predicted fluid property gradients. If the differences between the magnitudes satisfy certain constraints, the workflow infers a likelihood that the reservoir is compartmentalized. For example, a large increase between the magnitude of the viscosity gradient derived from downhole fluid analysis and the magnitude of the predicted asphaltene concentration gradient (and/or predicted GOR gradient) infers a likelihood that reservoir fluids are compartmentalized by a tar mat within the localized area. Conversely, small differences between the magnitude of the viscosity gradient derived from downhole fluid analysis and the magnitude of the predicted asphaltene concentration gradient (and/or predicted GOR gradient) infers a likelihood that the reservoir is non-compartmentalized within the localized area. In another example, a large increase between the magnitude of the GOR gradient derived from downhole fluid analysis and the magnitude of the predicted asphaltene concentration gradient infers a likelihood that reservoir fluids are compartmentalized by a tar mat within the localized area. Conversely, small differences between the magnitude of the GOR gradient derived from downhole fluid analysis and the magnitude of the predicted asphaltene concentration gradient infers a likelihood that the reservoir is non-compartmentalized in the localized area. Additional operations can be carried out to identify the likely cause of the compartmentalization of the reservoir.

Lack of thermodynamic equilibrium in the reservoir is investigated by carrying out both downhole and laboratory measurements of the composition (e.g., GOR and asphaltene concentration) and possibly other physical properties (e.g., temperature) of fluids from multiple locations in a reservoir. Additional operations can be carried out to identify the likely cause of the non-equilibrium state of the reservoir fluids.

There have been described and illustrated herein a preferred embodiment of a method, system, and apparatus for downhole fluid analysis of the fluid properties of a reservoir of interest and for characterizing the reservoir of interest based upon such downhole fluid analysis. While particular embodiments of the invention have been described, it is not intended that the invention be limited thereto, as it is intended that the invention be as broad in scope as the art will allow and that the specification be read likewise. Thus, while particular equation of state models, solubility models, and applications of such models have been disclosed for predicting properties of reservoir fluid, it will be appreciated that other predictive models and applications thereof could be used as well. Moreover, the methodology described herein is not limited to stations in a vertical wellbore or in the same wellbore. For example, the workflow as described herein can be used to investigate wellbores with horizontal sections. In another example, measurements from samples from different wells can be analyzed as described herein for testing for lateral connectivity. In addition, the workflow as described herein can be modified. For example, it is contemplated that user input can select the solute type classes from a list of solute type classes for processing. The user might also be able to specify certain parameters for the processing, such as diameters that are used as input to the solubility model to derive concentration curves for the relevant solute part classes as well as optical density wavelengths that are used to correlate to concentrations measured by downhole fluid analysis. It will therefore be appreciated by those skilled in the art that yet other modifications could be made to the provided invention without deviating from its scope as claimed.

What is claimed is:

1. A method for characterizing petroleum fluid in a reservoir traversed by at least one wellbore, the method comprising:
   (a) at a plurality of measurement stations within the at least one wellbore, acquiring via a borehole tool at least one fluid sample at the respective measurement station and performing via a data processing system of the borehole tool downhole fluid analysis of the fluid sample to derive properties of the petroleum fluid of the reservoir as a function of location in the reservoir;
   (b) analyzing via the data processing system at least one property of the petroleum fluid of the reservoir as a function of location in the reservoir as derived in (a) to identify a localized area of the reservoir where there are discontinuities in the at least one property;
   (c) utilizing via the data processing system at least one predictive model to derive predicted properties of the petroleum fluid of the reservoir as a function of location in the reservoir at least for locations that cover the localized area of (b), wherein the at least one predictive model includes a solubility model that characterizes relative concentrations of a set of high molecular weight components as a function of depth as related to relative solubility, density, and molar volume of the high molecular weight components of the set at varying depth, wherein the solubility model treats the reservoir fluid as a mixture of two parts, the two parts being a solute part and a solvent part, the solute part comprising the set of high molecular weight components, and wherein the solubility model is based on a mathematical relationship of the form $$\frac{\phi_i(h_2)}{\phi_i(h_1)} = \exp\left\{ \frac{v_i g(\rho_m - \rho_i)(h_2 - h_1)}{RT} + \left(\frac{v_i}{v_m}\right)_{h_2} - \left(\frac{v_i}{v_m}\right)_{h_1} - \frac{v_i\left[(\delta_i - \delta_m)^2_{h_2} - (\delta_i - \delta_m)^2_{h_1}\right]}{RT} \right\}$$

where
$\phi_i(h_1)$ is the volume fraction for the solute part at depth h1,
$\phi_i(h_2)$ is the volume fraction for the solute part at depth h2,
$v_i$ is the partial molar volume for the solute part,
$v_m$ is the molar volume for the solvent part,
$\delta_i$ is the solubility parameter for the solute part,
$\delta_m$ is the solubility parameter for the solvent part,
$\rho_i$ is the partial density for the solute part,
$\rho_m$ is the density for the solvent part,
R is the universal gas constant, and
T is the absolute temperature of the reservoir fluid; and
   (d) comparing via the data processing system the properties of the petroleum fluid for the localized area as derived in (a) to the predicted properties of the petroleum fluid for the localized area as derived in (c) to determine a likelihood that the reservoir is compartmentalized in the localized area.

2. The method according to claim 1, wherein the discontinuities of (b) represent changes larger than those expected for non-compartmentalized reservoirs in a state of thermodynamic equilibrium.

3. The method according to claim 1, wherein the at least one property of the petroleum fluid derived in (a) and analyzed in (b) is selected from a group consisting of pressure, concentration of a high molecular weight fraction, density, viscosity, and GOR.

4. The method according to claim 3, wherein the high molecular weight fraction includes resin or asphaltene molecules.

5. The method according to claim 3, wherein the high molecular weight fraction includes asphaltene nanoaggregates.

6. The method according to claim 3, wherein the high molecular weight fraction includes asphaltene clusters.

7. The method according to claim 1, wherein the properties of the petroleum fluid predicted in (c) are selected from a group consisting of concentration of a high molecular weight fraction and GOR.

8. The method according to claim 7, wherein the high molecular weight fraction includes resin or asphaltene molecules.

9. The method according to claim 7, wherein the high molecular weight fraction includes asphaltene nanoaggregates.

10. The method according to claim 7, wherein the high molecular weight fraction includes asphaltene clusters.

11. The method according to claim 1, wherein the comparing of (d) determines a likelihood that the reservoir is compartmentalized in the localized area by comparing at least one property gradient derived in (a) to a different predictive property gradient derived in (c) for locations within the localized area.

12. The method according to claim 11, wherein the comparing compares a viscosity gradient derived in (a) to a predicted concentration gradient for a high molecular weight fraction derived in (c) for locations within the localized area.

13. The method according to claim 12, wherein the comparing of (d) determines a likelihood that the reservoir is compartmentalized in the localized area in the event that the magnitude of the viscosity gradient derived in (a) is significantly larger than the magnitude of the predicted concentration gradient of the high molecular weight fraction derived in (c) for locations within the localized area.

14. The method according to claim 11, wherein the comparing compares a density gradient derived in (a) to a predicted concentration gradient for a high molecular weight fraction derived in (c) for locations within the localized area.

15. The method according to claim 11, wherein the comparing compares a concentration gradient of a high molecular weight fraction derived in (a) to a predicted GOR gradient derived in (c) for locations within the localized area.

16. The method according to claim 15, wherein the comparing of (d) determines a likelihood that the reservoir is compartmentalized in the localized area in the event that the magnitude of the concentration gradient of the high molecular weight fraction derived in (a) is significantly larger than the magnitude of the predicted GOR gradient derived in (c) for locations within the localized area.

17. The method according to claim 11, wherein the comparing compares a GOR gradient derived in (a) to a predicted concentration gradient of a high molecular weight fraction derived in (c) for locations within the localized area.

18. The method according to claim 17, wherein:
   the comparing of (d) determines a likelihood that the reservoir is compartmentalized in the localized area in the event that the magnitude of the GOR gradient derived in (a) is significantly larger than the magnitude of the predicted concentration gradient of the high molecular weight fraction derived in (c) for locations within the localized area.

19. The method according to claim 11, further comprising performing additional operations to verify the presence of a sealing barrier within the localized area.

20. The method according to claim 1, further comprising:
(e) collecting at least one of fluid samples and core samples from the localized area; and
(f) performing laboratory experiments on fluids from the samples collected in (e) in order to determine a likelihood that the reservoir is in a state of thermodynamic non-equilibrium in the localized area and causation of the non-equilibrium state.

21. The method according to claim 20, wherein the laboratory experiments of (f) measure at least one property of aromatic organic acids in the localized area to infer a likelihood that the reservoir fluids are in a state of thermodynamic non-equilibrium in the localized area caused by water washing.

22. The method according to claim 21, wherein the at least one property of aromatic organic acids measured in (f) is selected from the group consisting of molecular weight, degree of aromaticity, and number of acid groups.

23. The method according to claim 20, wherein the laboratory experiments of (f) measure at least one property of sulfoxide-containing molecules in the localized area to infer a likelihood that the reservoir fluids are in a state of thermodynamic non-equilibrium in the localized area caused by water washing.

24. The method according to claim 23, wherein the at least one property of sulfoxide-containing molecules measured in (f) includes concentration of sulfoxide-containing molecules.

25. The method according to claim 20, wherein the laboratory experiments of (f) measure at least one acid-related property in the localized area to infer a likelihood that the reservoir fluids are in a state of thermodynamic non-equilibrium in the localized area caused by biodegradation.

26. The method according to claim 25, wherein the at least one acid-related property measured in (f) includes a total acid number.

27. The method according to claim 20, wherein the laboratory experiments of (f) measure at least one biomarker in the localized area to infer a likelihood that the reservoir fluids are in a state of thermodynamic non-equilibrium in the localized area caused by biodegradation.

28. The method according to claim 20, further comprising:
(g) comparing a measured GOR gradient derived from downhole fluid analysis to a predicted GOR gradient to identify a localized area where the measured GOR gradient is smaller than the predicted GOR gradient, which suggests that the reservoir fluids are in a state of thermodynamic non-equilibrium within the localized area caused by convection.

29. The method according to claim 28, further comprising
(h) performing additional analysis for the localized area identified in (g) to infer a likelihood that the reservoir fluids are in a state of thermodynamic non-equilibrium within the localized area caused by convection.

30. The method according to claim 29, wherein the additional analysis of (h) analyzes asphaltene concentration gradients over the localized area identified in (g).

31. The method according to claim 30, wherein the additional analysis of (h) determines whether a measured asphaltene concentration derived from downhole fluid analysis is smaller than a predicted asphaltene concentration gradient in order to infer a likelihood that the reservoir fluids are in a state of thermodynamic non-equilibrium caused by convection.

32. The method according to claim 29, further comprising:
(i) performing additional analysis to determine causation of non-equilibrium conditions of the reservoir fluids.

33. The method according to claim 1, wherein the high molecular weight components of the solute part are selected from the group including resin or asphaltene molecules, asphaltene nanoaggregates, and asphaltene clusters.

34. The method according to claim 1, wherein the at least one predictive model further includes an EOS model.

35. The method according to claim 1, comprising adjusting an operating parameter of the borehole tool based on the comparison.

* * * * *